United States Patent [19]

Bione et al.

[11] 4,428,269
[45] Jan. 31, 1984

[54] CHORD TEACHING SYSTEM AND METHOD FOR AN ELECTRONIC MUSICAL INSTRUMENT

[75] Inventors: Angelo A. Bione, Elmhurst; Donald R. Sauvey, Palatine, both of Ill.

[73] Assignee: The Marmon Group, Inc., Chicago, Ill.

[21] Appl. No.: 340,584

[22] Filed: Jan. 18, 1982

[51] Int. Cl.³ .................. G10G 1/02; G10G 3/04; G10H 1/38; G10H 1/40
[52] U.S. Cl. ...................... 84/1.01; 84/1.03; 84/478; 84/DIG. 12; 84/DIG. 22
[58] Field of Search .................. 84/1.01, 1.03, 478, 84/DIG. 12, DIG. 22

[56] References Cited

U.S. PATENT DOCUMENTS

| | | | |
|---|---|---|---|
| 4,012,979 | 3/1977 | Wemekamp | 84/1.01 |
| 4,054,868 | 10/1977 | Rose | 84/478 |
| 4,061,072 | 12/1977 | Del Castillo | 84/478 |
| 4,203,345 | 5/1980 | Collin et al. | 84/478 |
| 4,281,579 | 8/1981 | Bennett, Sr. | 84/478 |
| 4,292,874 | 10/1981 | Jones et al. | 84/1.03 |
| 4,300,430 | 11/1981 | Bione et al. | 84/1.01 |
| 4,311,076 | 1/1982 | Rucktenwald et al. | 84/1.03 |
| 4,344,344 | 8/1982 | Nakada et al. | 84/1.03 |
| 4,361,065 | 11/1982 | Wilcox et al. | 84/1.03 |
| 4,364,299 | 12/1982 | Nakada et al. | 84/478 |

FOREIGN PATENT DOCUMENTS 54-118226 9/1979 Japan .

OTHER PUBLICATIONS

*More Music Makers Magic,* Motorola Semiconductor Products, Inc., Jun. 25, 1967, pp. 01002–01017.
*Technics Owners Guide for U20, U30, U40, U50 and U60 Organs,* 1980, pp. 53–56.

*Primary Examiner*—S. J. Witkowski
*Attorney, Agent, or Firm*—Neuman, Williams, Anderson & Olson

[57] ABSTRACT

The present invention is a chord teaching system and method which assists the organist in learning musical chords. The system functions in several different modes and the various modes are selected by the learning organist. The chord teaching system enables the learning organist to select a chord without demonstrating any knowledge of the correct finger position on the keyboard of the organ necessary to play the chord. The system, depending upon the mode of operation, plays the chord selected and indicates to the learning organist the key corresponding to the root note of the selected chord or indicates to the organist the keys corresponding to the notes of the selected chord or enables the organist to depress the keys that the organist believes form the selected chord and indicates a correct response if the organist depresses the proper key and indicates the correct keys that form the notes of the chord if the response is incorrect. In addition, the learning organist can store into the system's memory a sequence of chords for later playback. In one mode of operation, the root note of each chord in the stored sequence is indicated to the organist who must correctly depress a key corresponding to the root note in order to sound the chord and advance in sequence to the next stored chord. In another mode of operation, the notes forming each chord in the stored sequence are indicated to the organist who must correctly depress keys corresponding to the notes in order to advance in sequence to the next stored chord. In yet another mode of operation, the stored chords are sounded at times under control of the rhythm unit of the organ and the keys corresponding to the sounding chord are indicated to the organist.

51 Claims, 11 Drawing Figures

CHORD TEACHING SYSTEM AND METHOD FOR AN ELECTRONIC MUSICAL INSTRUMENT

BACKGROUND OF THE INVENTION

1. Field of the Invention

This invention relates to a chord teaching device and method which assists the organist in learning and playing chords. One of the most difficult tasks for the beginning organist is learning the correct finger position for the various chord types such as major, minor and seventh and applying this proper finger position for the various alphabetic keys to obtain chords such as C major, D seventh and E# minor.

The scarcity of organ teachers has placed an even greater burden on the beginning organist to not only learn the various chords but to incorporate new and increasingly complicated chords into songs without personal instruction. It is desirable to enable the organist to teach himself while at the same time simulating the learning environment provided by the teacher. Thus a chord teaching device for the self taught organist should enable the learning organist to hear the sound of a chord to be learned, to see the keys which must be depressed to make the chord, and to create a situation of positive reinforcement if the organist properly plays the chord to be learned either individually or as part of a song.

Whie the present invention is described herein with reference to a particular embodiment, it should be understood that the invention is not limited thereto. The chord teaching system of the present invention may be employed in a variety of forms, as one skilled in the art will recognize in light of the present disclosure.

2. Prior Art

Chord teaching systems are known in the electronic organ industry. In addition, known teaching systems use visual displays associated with the keyboard and/or pedals. These systems frequently depend upon external prerecorded information which is supplied to the organ to activate the teaching sequence. Furthermore, known chord teaching systems provide means for the organist to store selected chords within a memory for subsequent playback but also require the organist to determine the timing sequency of playback among other things which makes chord programming complicated. In addition, the concept of using normalized chord patterns to reduce logic circuit requirements and the scanning of keyboard input lines to determine the root or alphabetic note of a chord being played is disclosed in U.S. Pat. No. 4,144,788 which issued on Mar. 20, 1979 to Bione et al and U.S. Pat. No. 4,300,430 which issued on Nov. 17, 1981 to Bione et al both of which are assigned to the assignee of the present invention.

It is an object of the present invention to provide a chord teaching system to enable the organist to teach himself the proper key position for various musical chords.

It is another object of the present invention to provide a chord teaching system which simulates the positive reinforcement of an actual teacher.

It is still another object of the present invention to enable the learning organist to select the type of musical chord to be learned and the alphabetic key of the selected chord type.

It is a further object of the present invention to permit the learning organist to select the chord to be learned and then progress at his own rate by repeating the learning sequence with the same chord or by going on to learn different or more complicated chords.

It is yet another object of the present invention to enable the learning organist to both hear the chord to be learned and see at least the key to be depressed in order to play the root note.

It is another object of the present invention to enable the beginning organist to select a type of musical chord and to depress a single key representing the alphabetic or root note of the chord and hear the chord to be learned.

It is another object of the present invention to illustrate the correct pedal key which accompanies the chord selected by the beginning organist.

It is another object of the present invention to enable the beginning organist to select a type of musical chord and to depress a single key representing the alphabetic or root note of the chord and see the keys which should be depressed in order to form the chord.

It is another object of the present invention to enable the learning organist to test his/her mastery of the correct key position of various chords by selecting a chord to be tested without demonstrating knowledge of the correct key position of the chord, depressing a plurality of keys corresponding to the key position which the learning organist believes corresponds to the key position of the selected chord, indicating that the response was correct or if incorrect indicating to the learning organist the correct key position.

It is another object of the present invention to enable the beginning organist to program a number of selected chords into the chord teaching system in a desired sequence, for example, the order in which the chords appear in a song and then attempt to play the song with the correct finger position for each stored chord which is illustrated to the learning organist in the desired sequence and providing that each illustrated chord be properly played before the next chord in the stored sequence is illustrated.

It is a further object of the present invention to enable the learning organist to program selected chords into the chord teaching system in a desired sequence, for example, the order in which the chords appear in a song and have the chords automatically played back in the desired sequence and have the finger position of each played chord illustrated for the learning organist all under the timing control of the rhythm unit in the organ.

Other objects of the present invention will be apparent from the following summary and detailed description.

SUMMARY OF THE INVENTION

Figure 1:
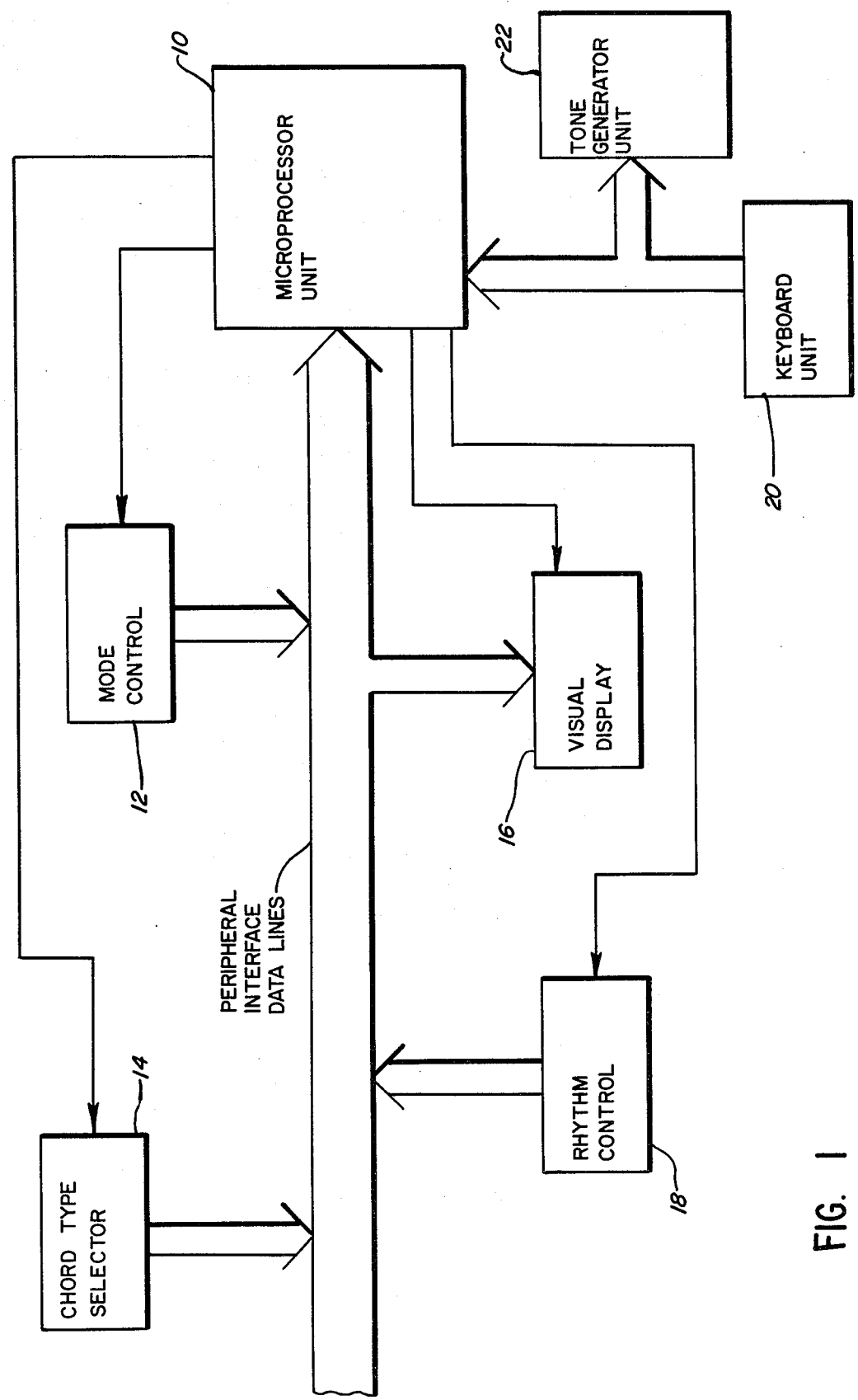
FIG. 1 is a block diagram of the chord teaching system for use in an electronic organ.

The present invention is directed to a chord teaching system and method for an electronic musical instrument, in particular an electronic organ. The chord teaching system enables the learning organist to engage in many chord learning exercises in much the same way that an instructor would teach chords to a pupil. However, the present invention enables the learning organist to engage in a learning experience at any time rather than only during preplanned lessons; the learning organist can progress at his/her own speed without the external pressure of an instructor or classmates; and, the learning organist is liberated from his/her dependence upon an instructor illustrating how the various chords are played within the context of a song.

The chord teaching system operates in seven different modes namely, one finger chords, three finger chords, chord quiz, program, program plus one finger chords, program plus three finger chords, and program plus autoperform. A mode control panel comprising a plurality of switches is located on the console of the organ and the organist selects the mode of operation by actuating these switches. In one mode of operation of the chord teaching system a rhythm unit under control of the organ's rhythm clock controls the timing at which pre-selected chords are played and the keys forming the playing chord are indicated to the learning organist. A chord type selector comprising a plurality of switches is also located on the console of the organ and the organist selects the type of chord to be learned and/or played by the chord teaching system by actuating these switches. The types of chordes that can be selected by the learning organist are major, minor, seventh, minor seventh, major seventh, diminished, sixth or augmented.

A visual display indicator is located on the organ console between the keyboards and over the keys associated wth the chord teaching system to indicate to the learning organist which keys form the chord to be learned. In an alternative embodiment the visual indicator also comprises a plurality of lights located over selected pedal keys and corresponding circuitry to control the lights to indicate to the learning organist which pedal keys should be played in association with the chord to be learned. It is preferred organ teaching practice to instruct the beginning organist to form all chords within a thirteen note range on the lower manual. The chord teaching system is designed to function with thriteen keys of the lower of left hand manual, in particular the key of F in the second octave to the key of F in the third octave.

A microprocessor unit receives input information from the keyboard and various other input devices, performs the appropriate calculations, and provides output signals and control signals to control the visual indicator, the tone generator of the organ and various other devices. The microprocessor has all the mathematical note combinations for the different chord types stored in memory and to reduce the amount of storage capacity and to improve operation, the chord types are normalized to the key of F. The microprocessor itself is a standard item available from several manufacturers of electronic components and is controlled by a program set forth in detail hereinafter.

The different modes of operation of the chord teaching system are as follows:

1. One Finger Chords

To initiate the one finger chord mode of operation the learning organist activates the one finger chord switch in the mode control panel on the organ console. In the one finger chord mode of operation the learning organist selects the chord type and the alphabetic key and the chord teaching system illuminates a light in the visual indicator above the alphabetic key and plays the selected chord.

In the one finger chord mode of operation the organist selects the chord type from the chord type selector on the organ console. This selection by the organist fixes the type of chord to be played and shown on the visual indicator. The selection of the chord type remains fixed until changed by the organist regardless of the number of alphabetic keys played by the organist. The organist now selects the letter note or key of the chord to be played by depressing one of the keys on the left hand manual within the thirteen note range associated with the system. The microprocessor unit retrieves the normalized chord type information from memory which corresponds to the chord type selected by the learning organist, determines which letter note is depressed and then shifts the normalized chord type information into the key selected by the learning organist. Now the microprocessor activates the visual indicator to illuminate the light above the key depressed on the left hand manual and sends appropriate output signals to the tone generator to sound the chord type in the selected key. In an alternative embodiment, if the organist also activates another switch on the mode control panel referred to as Brite Foot or pedals the system also illuminates the light above the pedal corresponding to the depressed key. The organist can sustain the chord being played by either keeping the key depressed or by turning on the memory switch which is part of the mode control. The learning organist can now repeat the above sequence for the same chord type by selecting other alphabetic keys within the thirteen note range, or the learning organist can select a new chord type by depressing a different switch on the chord type selector panel and then repeat the sequence by depressing an alphabetic key within the thriteen note range.

2. Three Finger Chords

To initiate the three finger chord mode of operation the learning organist activates the three finger chord switch in the mode control panel on the organ console. In the three finger mode of operation the learning organist selects the chord type and the alphabetic key and the chord teaching system illuminates the lights in the visual indicator above the keys forming the chord.

in the three finger mode of operation the organist selects the chord type from the chord type selector on the organ console. The learning organist must activate a chord type switch after each cycle of the chord teaching system in the three finger chord mode. The organist now selects the letter note or key of the chord to be illustrated by depressing one of the keys on the left hand manual within the thirteen note range associated with the system. The microprocessor unit determines which letter note is depressed, retrieves the normalized chord type information from memory which corresponds to the chord type selected by the learning organist, shifts the normalized chord type information into the selected key and illuminates a light above each key which would have to be depressed in order to form the chord type in the selected key. In an alternative embodiment, if the organist also activates another switch on the mode control panel referred to as Brite Foot or pedals the system illuminates the light above the pedal corresponding to the root note of the selected chord. In the three finger chord mode of operation there is no musical output signals generated by the chord teaching system and the organist concentrates on the proper finger placement. Of course, the organ continues to produce the normal musical output corresponding to keys depressed by the organist.

3. Chord Quiz

To initiate the chord quiz mode of operation the learning organist activates the chord quiz switch in the mode control panel on the organ console. In the chord quiz mode of operation the learning organist can interrogate himself as to his knowledge of the correct finger position for selected chords. The learning organist receives positive reinforcement for correct responses and is shown the correct finger position if his finger position is incorrect. This mode of operation closely simulates the actual student/teacher learning situation but eliminates the need for the presence of the teacher.

In this mode of operation the system does not produce any musical output signals, however, there is the normal musical output corresponding to any depressed keys. When the organist places the chord teaching system into the chord quiz mode by depressing the appropriate switch on the mode control the microprocessor activates all the lights on the visual indicator in a scanning pattern. The organist now selects a type of chord by turning on a switch in the chord type selector on the organ console and then selects the key of the chord by depressing a key on the left hand manual within the thirteen note range associated with the system. The microprocessor determines the letter note of the depressed key, retrieves the normalised chord type information from memory which corresponds to the chord type selected by the learning organist and shifts the normalized chord type into the key selected by the learning organist.

The learning organist has selected a chord type and an alphabetic key for the chord type without having to demonstrate any knowledge of the proper key pattern which forms the selected chord. In order to test his/her knowledge of the correct key position of the selected chord the learning organist must now depress the keys within the thriteen note range associated with the system corresponding to the selected chord. The microprocessor determines that the organist has released the previously depressed key used to input the alphabetic note information and waits for the learning organist to depress keys in an attempt to properly play the selected chord. The next key depressed on the left hand manual within the thirteen note range associated with the system initiates a time delay in the microprocessor to provide the learning organist sufficient opportunity to depress all the keys he/she chooses which corresponds to the selected chord. If after depressing one or more keys the learning organist changes his/her mind and releases the keys within the delay time the microprocessor recycles to the beginning to enable the learning organist to select another group of keys which correspond to the selected chord. If the learning organist still has keys depressed at the end of the time delay period then the microprocessor compares the depressed keys to the shifted normalized chord which corresponds to the chord selected by the organist. If the comparison indicates that the learning organist has correctly played the selected chord the microprocessor causes all the lights in the visual indicator to scan. If the comparison indicates that the learning organist has incorrectly played the selected chord then the microprocessor illuminates the appropriate lights above the proper keys to form the selected chord. These lights stay illuminated until the organist releases all the depressed keys which had formed his/her improper response. After all depressed keys are released the microprocessor extinguishes the lights for the selected chord and recycles to provide the learning organist an opportunity to again select the proper keys to form the selected chord. A new chord cannot be entered into the chord quiz mode until the previously selected chord is properly played or until the chord quiz mode is turned off.

4.

To initiate the program mode of operation the learning organist activates the program switch in the mode control panel on the organ console. In the program mode of operation the learning organist inputs one or more chords into the microprocessor memory for future use in one of the program plus modes of operation described hereinafter.

After the organist depresses the program switch on the mode control panel located on the organ console the chord teaching system is ready to receive into memory up to seventy-six (76) chords selected by the organist. The organist selects the chord type by depressing one of the switches on the chord type selector on the organ console. The selection of the chord type remains fixed until changes by the organist regardless of the number of chords and alphabetic note combinations entered into memory. The learning organist now selects the letter note or key of the chord to be placed into memory by depressing one of the keys on the lower or left hand manual within the thirteen note range associated with the chord teaching system. The microprocessor unit determines which key is depressed by the organist. The key information and the chord type information are stored in the first memory location provided in the microprocessor for storing selected chords. In addition to storing the key information and chord type information the microprocessor unit retrieves from memory the normalized chord pattern which corresponds to the chord type selected, and shifts the normalized chord into the key selected by the learning organist. The microprocessor unit now sends appropriate output signals (the shifted normalized chord information) to the tone generator where the selected chord is played and to the visual indicator where lights are illuminated above the keys forming the chord. The chord teaching system is now ready to receive the next chord selected by the organist and to store the key information and chord type information corresponding to the selected chord in the next memory location provided in the microprocessor for storing selected chords. The learning organist can now repeat the above sequence for the same chord type by selecting another alphabetic note within the thirteen note range or the learning organist can select a new chord type by depressing a different switch on the chord type selector panel and then selecting the alphabetic key for the newly selected chord type. By repeating the above sequence the organist can store into memory seventy-six (76) chords to be played back in either the program plus one finger chorde mode, the program plus three finger chord mode or the program plus autoperform mode. In addition to the above the program mode is provided with an erase or reset function which enables the learning organist to erase one or more stored chords from memory so that the sequence of stored chords can be changed or errors corrected.

5. Program Plus One Finger Chords

To initiate the program plus one finger mode of operation the learning organist activates both the program switch and the one finger chord switch in the mode control panel on the organ console. In the program plus one finger chord mode the learning organist is presented with a sequence of stored chords and must properly depress the alphabetic key corresponding to the root note of each stored chord in order to move to the next chord in the sequence. Thus the learning organist can play the proper chord sequence for a song which has previously been programmed into memory by depressing the alphabetic note or key associated with each stored chord during the course of playing the melody for the song. The microprocessor unit illuminates the light above the key on the lower manual to be depressed and when the learning organist depresses the correct alphabetic key the tone generator plays the corresponding stored chord. Furthermore, in an alternative embodiment, if the organist activates another switch on the mode control panel referred to as Brite Foot or pedals the system illuminates the light above the pedal corresponding to the root note of the stored chord. In this mode the learning organist merely sees the light indicating the correct pedal and does not have to depress the pedal to move to the next chord in the sequence.

In the program plus one finger chord mode the organist depresses both the program and one finger chord switch on the mode control and the chord teaching system determines the first chord stored in memory by the organist during the program mode of operation and illuminates the light of the visual display unit which is above the key corresponding to the root note of the stored chord. The learning organist now must depress the proper key on the lower manual corresponding to the light of the visual display unit. The chord teaching system determines the key depressed by the organist and compares it to the key information stored in memory for the first chord. If the depressed key does not equal the key information stored in the memory location, the light of the visual indicator unit remains on and the appropriate chord does not play. If the depressed key is the same as the key information then the chord teaching system uses the stored key information and the chord type information to retrieve a normalized chord from memory which corresponds to the chord type information and to shift the normalized chord to the proper key. The shifted normalized chord information is sent to the tone generator to play the selected chord. The chord teaching system continues to play the selected chord if the memory switch on the mode control panel is depressed or if the key on the lower manual remains depressed. In addition, the chord teaching system selects the chord stored in the next memory location and illuminates the appropriate light above the key on the lower manual corresponding to the root note of the second stored chord. The above sequence is repeated for each chord stored in the memory of the chord teaching system thereby providing positive reinforcement to the learning organist for the correct selection of the root notes of the stored chords while also providing the flexibility of enabling the learning organist to select any sequence of chords desired to be placed into memory.

6. Program Plus Three Finger Chords

To initiate the program plus three finger mode of operation the learning organist activates both the program switch and the three finger switch in the mode control panel on the organ console. In the program plus three finger chord mode the learning organist is presented with a sequence of stored chords and must properly depress the keys corresponding to each stored chord in order to move to the next chord in the sequence. Thus the learning organist can play the proper chord sequence for a song previously programmed into memory by depressing the keys forming each stored chord. The microprocessor unit illuminates the lights in the visual display above the keys on the lower manual corresponding to the stored chords. Furthermore, in an alternative embodiment, if the organist activates another mode control switch referred to as Brite Foot or pedals the system illuminates the light above the pedal corresponding to the stored chord. However, the learning organist does not have to depress the indicated pedal to cause the system to move to the next stored chord.

In the program plus three finger chord mode the organist depresses both the program and three finger chord switch on the mode control and the chord teaching system determines the first chord stored in memory by the organist during the program mode of operation and illuminates the lights of the visual display unit which are above the keys corresponding to the notes of the stored chord. The learning organist now must depress the proper keys on the lower manual corresponding to the lights on the visual display unit. The chord teaching system determines which keys are depressed by the organist. The information stored in the first memory location is used to retrieve the normalized chord information corresponding to the chord type information and to shift the normalized chord information into the proper key. The information corresponding to the keys depressed by the learning organist is then compared to the shifted normalized chord. If the depressed keys do not correspond to the shifted normalized chord the lights on the visual indicator unit remain on. If the depressed keys do correspond to the normalized chord then the chord teaching systems selects the chord stored in the next memory location and illuminates the appropriate lights on the visual indicator unit corresponding to the keys forming the next chord. The above sequency is repeated for each chord stored in the memory of the chord teaching system thereby providing positive reinforcement to the learning organist for the correct selection of the stored chords while also providing the flexibility of enabling the learning organist to select any sequence of chords desired to be placed into memory.

7. Program Plus Autoperform

To initiate the program plus autoperform mode of operation the learning organist activates both the program switch and the autoperform switch in the mode control panel on the organ console. In the program plus autoperform mode the chord teaching system plays a sequence of preprogrammed chords at times controlled by the rhythm unit of the organ and illuminates the lights on the visual indicator above the keys forming the chord being played. Furthermore, in an alternative embodiment, if the learning organist activates another switch on the mode control panel referred to as Brite Foot or pedals the system illuminates the lights above the pedal corresponding to the root and fifth note of the stored chord.

In the program plus autoperform mode of operation the organist depresses both the autoperform and program switches on the mode control and the chord teaching system determines the first chord stored in the memory by the organist during an earlier program mode and illuminates the lights of the visual display unit corresponding to each note in the chord. The chord teaching system automatically plays and illuminates each stored chord at appropriate times in each measure based upon the rhythm clock of the organ. For example, if the rhythm unit is running in 4/4 time the stored chords are played and illustrated at the first and third beat of each measure while if the rhythm unit is running 3/4 time the stored chords are played and illuminated at the first beat of each measure. The chord teaching system thus distinguishes between 4/4 time or 3/4 time or others based upon information received from the rhythm unit not upon information programmed into the system by the organist. Thus in 4/4 time the microprocessor of the chord teaching system receives an input signal from the rhythm clock of the organ and at every two beats the next appropriately stored chord is played and the notes for the stored chord that is being played are illuminated on the visual indicator. In this mode the learning organist can program a sequence of chords for a song and have the chord teaching system play the sequence of stored chords at the appropriate location in each measure while illuminating the notes of the chord being played. Thus the learning organist can hear the chord being played at the appropriate place in the song and also see the keys that would have to be depressed to actually play the chord. The learning organist can concentrate on the playing of the melody and the timing between the melody and the chords without having to actually play the chords.

DETAILED DESCRIPTION

Figure 2:
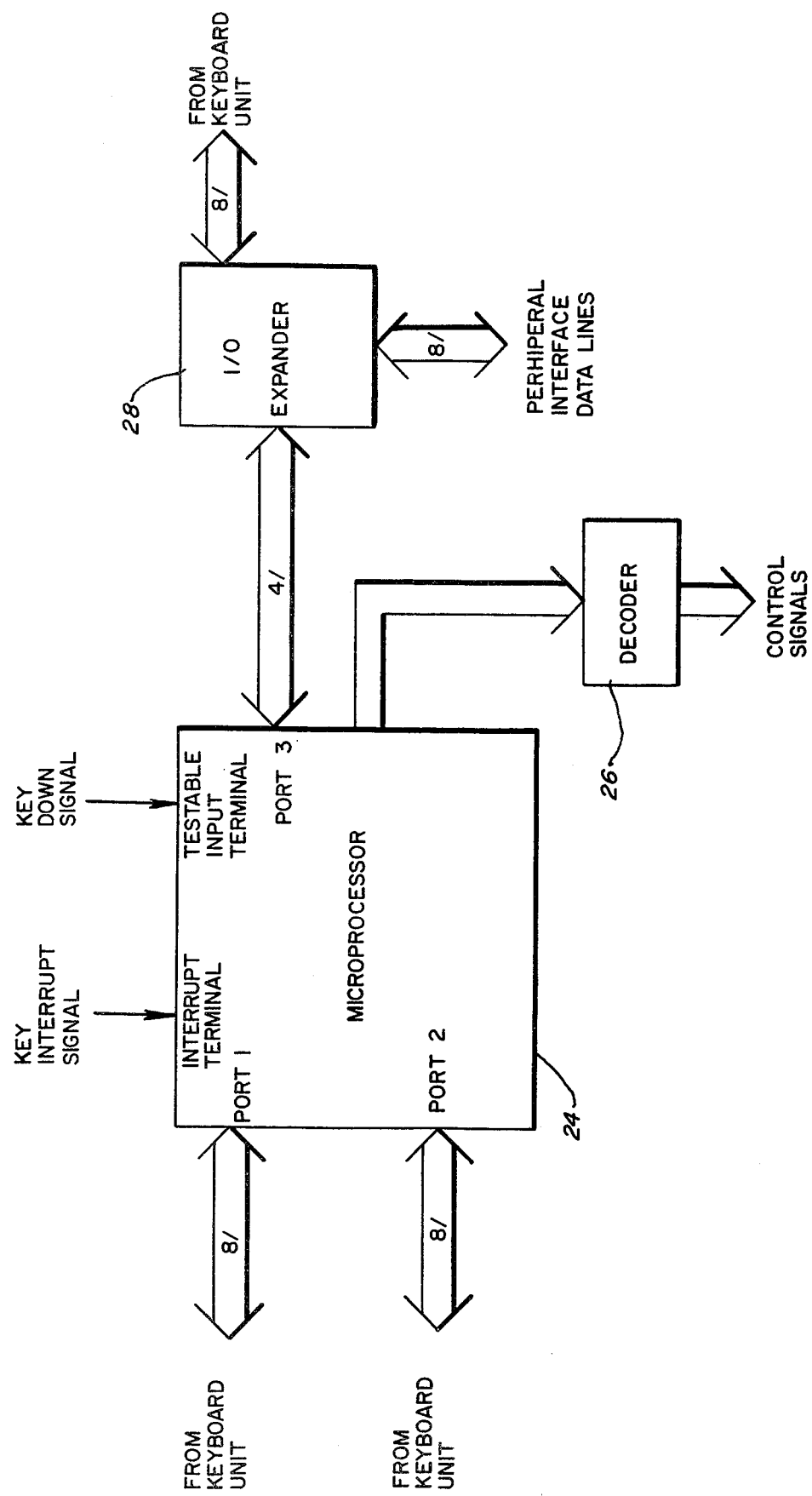
FIG. 2 is a block diagram of the microprocessor unit shown in FIG. 1.
Figure 3:
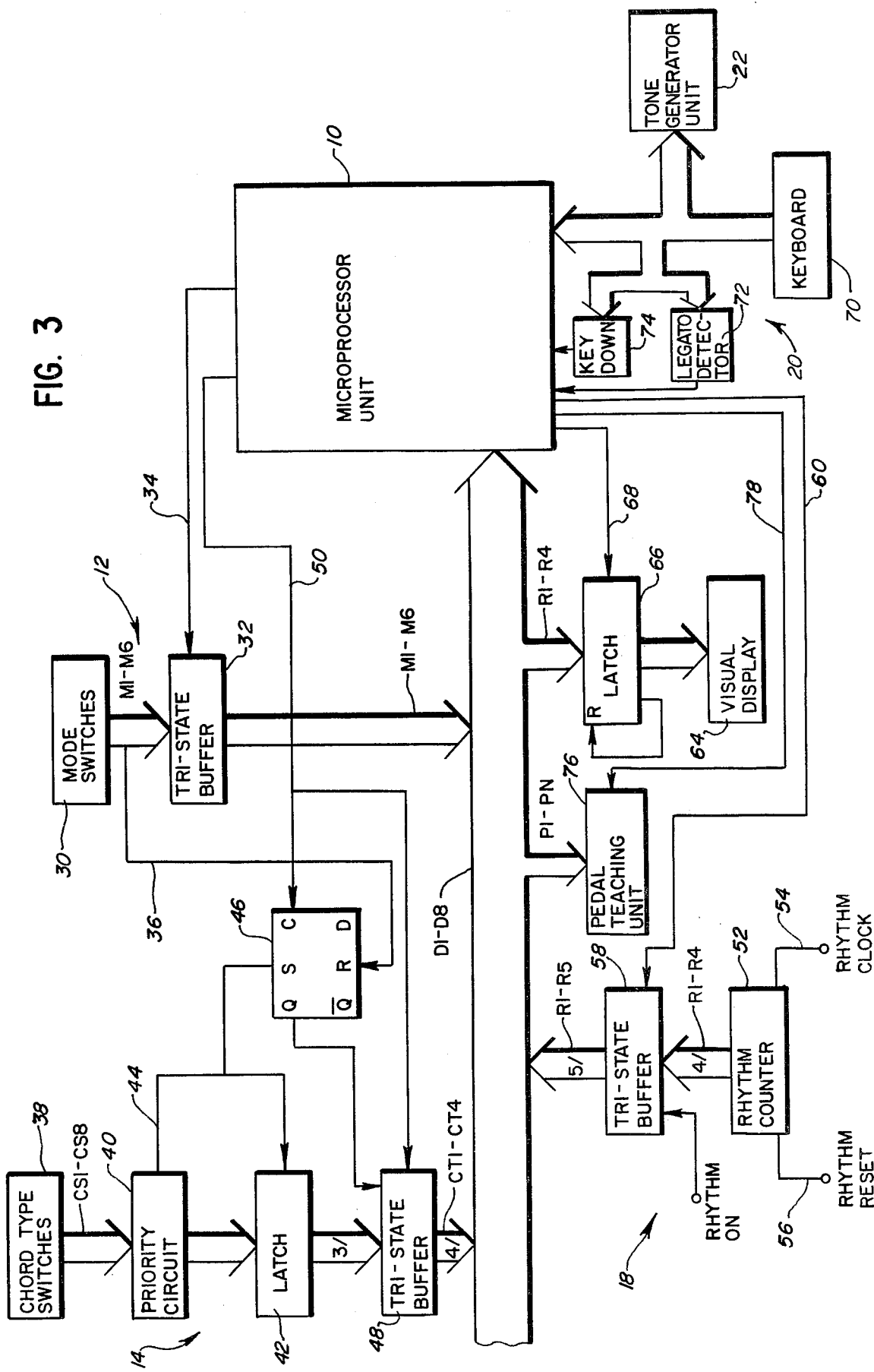
FIG. 3 is a more detailed block diagram of the chord teaching system shown in FIG. 1.

The chord teaching system for use in an electronic organ operates in seven different modes and the basic circuit structure is shown in FIGS. 1-3. The chord teaching system includes a microprocessor unit 10, a mode control 12, a chord type selector 14, a visual display 16, a rhythm control 18, a keyboard unit 20 and a tone generator unit 22. The organist selects the outputs from the mode control 12, the chord type selector 14 and of course, the keyboard 20. These output information signals from the mode control 12, the chord type selector 14 and the keyboard 20 are applied via the peripheral interface data lines to the microprocessor unit 10. In one mode of operation output information signals from the rhythm control 18, which is under control of the rhythm clock of the organ itself, are applied to the microprocessor unit 10 via the peripheral interface data lines. After receiving the appropriate output information signals described above the microprocesor unit 10 under control of the program described in detail hereinafter applies information signals to the visual display 16 via the peripheral interface data lines. The microprocessor unit 10 also provides control or access signals to the mode control 12, chord type selector 14, rhythm control 18 and visual display 16 to determine the time that information signals are sent to or received from these devices. The keyboard 20 provides output signals to the tone generator 22 for producing musical output in accordance with the well known operation for an electronic organ. It should be obvious to one of ordinary skill in the art that the tone generator unit 22 comprises all of the common organ circuits necessary to provide a musical output in response to the signal received from the keyboard. Since the operation of this portion of an electronic organ is well known and does not form any part of the present invention further description is considered unnecessary. The microprocessor unit 10 also provides output signals in certain modes of operation to the tone generator output 22 for producing musical output.

As shown in FIG. 2 the microprocessor unit 10 comprises a microprocessor 24, a decoder 26 and an input/output expander 28. the microprocessor 24 is an 8049 available from Intel Corporation of Santa Clara, Calif.; extensive information concerning the interconnections, use, and programming of the microprocessor is publicly available from Intel Corporation. Equivalent devices manufactured by others could be used and corresponding information concerning such devices is available from their respective manufacturers. Further detail regarding the microprocessor 24 is unnecessary and would unnecessarily complicate this description. Similarly, only the connections between the microprocessor 24 input/output data lines and control lines and the various input and output devices are shown in FIGS. 1-3. Other necessary connections would be obvious to one of ordinary skill in the art.

The microprocessor 24 receives input information from twenty-four keying lines associated with twenty-four keys on the lower or left hand manual. Thirteen of these keys from the key of F in the second octave to the key of F in the third octave establish the input range of the chord teaching device. The remaining eleven keying lines are used if the electronic memory function of the organ is activated. As is well known an electronic memory function sustains the tone signal output of an electronic organ after the depressed keys are released. The microprocessor receives eight keying lines at the terminals of port no. 1, and eight more keying lines at the terminals of port no. 2. In order to conserve the available terminals of the 40 terminal microprocessor 24 the final eight keying lines from the keyboard are received by input/output expander 28 and coded onto four lines which are received at terminals of port no. 3 of the microprocessor 24 and in a well known manner expanded to the original eight lines of keying information. In the preferred embodiment input/output expander 28 is an 8243 available from Intel Corporation and information concerning the operation of input/output expander 28 is publicly available from Intel. However, it should be noted that equivalent devices are available from other manufacturers and information concerning them is respectively available from their manufacturers. The microprocessor also places output signals upon the same keying lines to drive the tone generator 22 when appropriate.

The input/output expander 28 also receives information on eight peripheral interface data lines from the mode control 12, the chord type selector 14 and the rhythm control 18. This data information is reduced to four lines by the input/output expander 28 and is received by the microprocessor 24 at the terminals of port 3. The microprocessor 24 also provides output control signals at the remaining four terminals of port 3. The output control signals from the microprocessor 24 are received by the decoder 26 and converted into individual control signals for the other devices shown in FIGS. 1-3. In the preferred embodiment the decoder is a CD4514 available from RCA Corporation and information concerning the operation of the decoder 26 is publicly available from RCA. However, it should be obvious to one of ordinary skill that equivalent devices could be used. The microprocessor 24 also receives input information at the interrupt terminal which indicates that one of the thirteen keys on the lower manual associated with the system has been depressed. This input information is commonly referred to as a key interrupt or legato signal. Finally the microprocessor 24 receives input information at at least one of the testable inputs which indicates that at least one of the keys on the lower manual associated with the system is depressed. This input information is commonly referred to as a key down signal.

FIG. 3 shows a more detailed block diagram of the chord teaching systems for use with an electric organ. The mode control 12 comprises a panel of mode switches 30 located upon the organ console. In the preferred embodiment the mode switches include the following switches: one finger chords, three finger chords, program, erase, autoperform, chord quiz and memory. It should be understood that additional switches can be included in the mode control switches 30 such as a switch to control the pedal teaching device which is further described hereinafter. The switch output signals on lines M1-M6 are received by a tri-state buffer circuit 32. The tri-state buffer circuit functions as a isolator gate which passes the input signal to the output when a signal, in the preferred embodiment a logic 0, is present at the disable input and which functions as a high impedance to block the input signal from the output when an opposite level signal is present at the disable input. The operation of such a buffer circuit is well known to one of ordinary skill in the art. The tri-state buffer 32 is accessed by the microprocessor unit 10 via control line 34 which is connected to the disable input of buffer 32. The three finger chord switch line M2 is also connected to the chord type selector 14 via line 36 to provide a switch output signal to the chord type selector when the chord teaching system is operating in the three finger chord mode. Upon receipt of the control signal on line 34 from the microprocessor unit 10 the signals at the input of buffer 32 are applied via lines M1-M6 to the peripheral interface data lines D1-D8 which are applied as inputs to the microprocessor unit 10. The information signals from the mode control 12 determine the mode of operation of the chord teaching system.

The chord type selector 14 is used by the learning organist to select a desired chord type for use in the chord teaching system. The organist selects the desired chord type by closing one of eight switch on the chord type switch panel 38 located on the organ console. The individual switches correspond to the following chord types: major, minor, seventh, minor seventh, major seventh, diminished, sixth and augmented. It should be obvious to one of ordinary skill in the music field that fewer or additional chord types could be used. The chord type switch output signals are connected on lines CS1-CS8 to a priority circuit 40. The priority circuit locks out subsequent chord type switches after one is activated. Priority circuits of this type are well known in the art and further description is deemed unnecessary. The priority circuit 40 passes the chord type output signals to latch circuit 42. In addition the priority circuit 40 provides a switch down signal on line 44 each time one of the chord type switches is closed. The switch down signal is applied to he latch circuit 42 and to the set input of bistable device 46.

The latch 42 passes the chord type output signals to a tri-state buffer circuit 48. The bistable 46 also provides an output signal to tri-state buffer 48 indicating that a chord switch has been depressed. This output signal from the bistable device 46 is only used when the system is operating in the three finger chord mode as is explained herein. The tri-state buffer circuit receives a control signal from the microprocessor unit 10 via line 50 at its disable input to apply its output signals via lines CT1-CT4 to the peripheral interface data lines D1-D8. The bistable device or flip-flop 46 also receives at its clear terminal the control signal from microprocessor unit 10 via line 50. The bistable device 46 also receives at its reset terminal the signal from mode switches 30 via line 36 indicating that the chord teaching system is in the three finger mode. When a chord type switch is depressed the bistable 46 normally provides a logic level 0 at its output Q. However, when the chord teaching system is in the three finger mode of operation bistable 46 receives a signal at its reset terminal and after receipt of the control signal via line 50 changes its output level until another signal is received at its reset terminal.

The rhythm control 18 comprises a rhythm counter 52 which receives a rhythm signal via line 54 from the rhythm clock of the electronic organ and a rhythm reset signal via line 56 to maintain synchronization between the rhythm clock of the organ and the rhythm counter 52. A tri-state buffer 58 receives the output signals from the rhythm counter and a signal on line 62 indicating that the rhythm unit is operating from the rhythm unit on switch in the electric organ. The tri-state buffer 58 receives a control signal from microprocessor unit 10 at its disable input via line 60 and passes the rhythm signals and the rhythm on signal on lines R1-R5 to the peripheral interface data lines D1-D8. The information from the rhythm control 18 determines when the chord teaching device will play and illustrate a new chord in the program plus autoperform mode of operation.

A visual display unit 16 comprises a set of lights 64 or other illuminating devices mounted above a select number of keys on the lower manual. In the preferred embodiment the lights are placed above the key F in the second octave and extend through the key F in the third octave making a total of thirteen keys. It should be apparent to one of ordinary skill in the art that other key and different numbers of keys could be selected without departing from the scope and teaching of the present invention. Also included as part of the visual display unit 16 is latch circuit 66 which receives data from the microprocessor unit 10 via peripheral interface data lines D1–D8 and lines V1–V4. In addition, latch 66 receives a control signal from microprocessor unit 10 via control line 68. The information received by visual display unit 16 over lines D1–D8 determines which lights 64 will be illuminated and the control information received via line 68 determines the time at which the lights 64 are illuminated. The last address of the latch circuit 66 is connected to the reset input so that by addressing this location all of the lights 64 are turned off.

In an alternative embodiment the visual indicator or display includes a plurality of lights located over selected pedals which form a part of the pedal teaching device 76 which is described in U.S. Pat. No. 4,183,276 which issued to Donald R. Sauvey and Angelo A. Bione on Jan. 15, 1980 and is assigned to he same assignee as the present invention and which is incorporated herein by reference. The information signals to operate the pedal teaching device 76 are received from the microprocessor unit 10 via peripheral interface data lines D1–D8 and pedal lines P1–PN. While the full operational capacity of this pedal teaching device can be used with the chord teaching device of the present invention the most desirable use of the pedal device is to illuminate the light above the pedal corresponding to the root note of the selected or stored chord. The pedal teaching device is considered part of the visual display 16 and is controlled by the signal on line 78 from microprocessor unit 10. Furthermore, the pedal teaching device must be activated by the learning organist by closing a switch on the mode control referred to as pedal or Brite Foot. Brite Foot is a registered trademark owned by the assignee of this invention to identify the pedal teaching system. Accordingly it should be understood that throughout the subsequent description of the operation of the chord teaching system when the visual display above the thirteen keys on the lower manual is illuminated that the visual display above the pedal should also be illuminated if the pedal switch in the mode control is activated. The pedal illumination is only for the visual learning benefit of the organist to teach which pedals correspond to the selected or stored chords and he/she does not have to actually depress the pedal during the operation of the chord teaching system.

The keyboard unit 20 includes at least one manual or keyboard 70, a legato detector 72 and a key down detector 74. The keyboard 70 includes a plurality of keys and as explained hereinbefore thirteen of those keys are associated with the system. The output signals from the keyboard are applied to the tone generator unit 22 for producing musical output in a well known manner and are applied to the microprocessor unit 10 as described above. The legato detector 72 receives the signals from the thirteen keys associated with the system and provides an output signal to the key interrupt terminal of the microprocessor 24 each time one of the thirteen keys are depressed. The key down detector 74 also receives the signals from the thirteen keys associated with the system and provides an output signal to the testable input terminal of microprocessor 24 as long as one of the thirteen keys associated with the system remains depressed. Both the legato detector 72 and the key down detector 74 are well known to those skilled in the art and accordingly further description is not deemed necessary.

FIGS. 4a–4g are flow charts for describing the operation of the chord teaching system of the present invention. In describing the operation of the system in the flow charts FIGS. 4a–4g reference is made to FIG. 3 to further explain the structural and circuit components of the system.

Figure 4A:
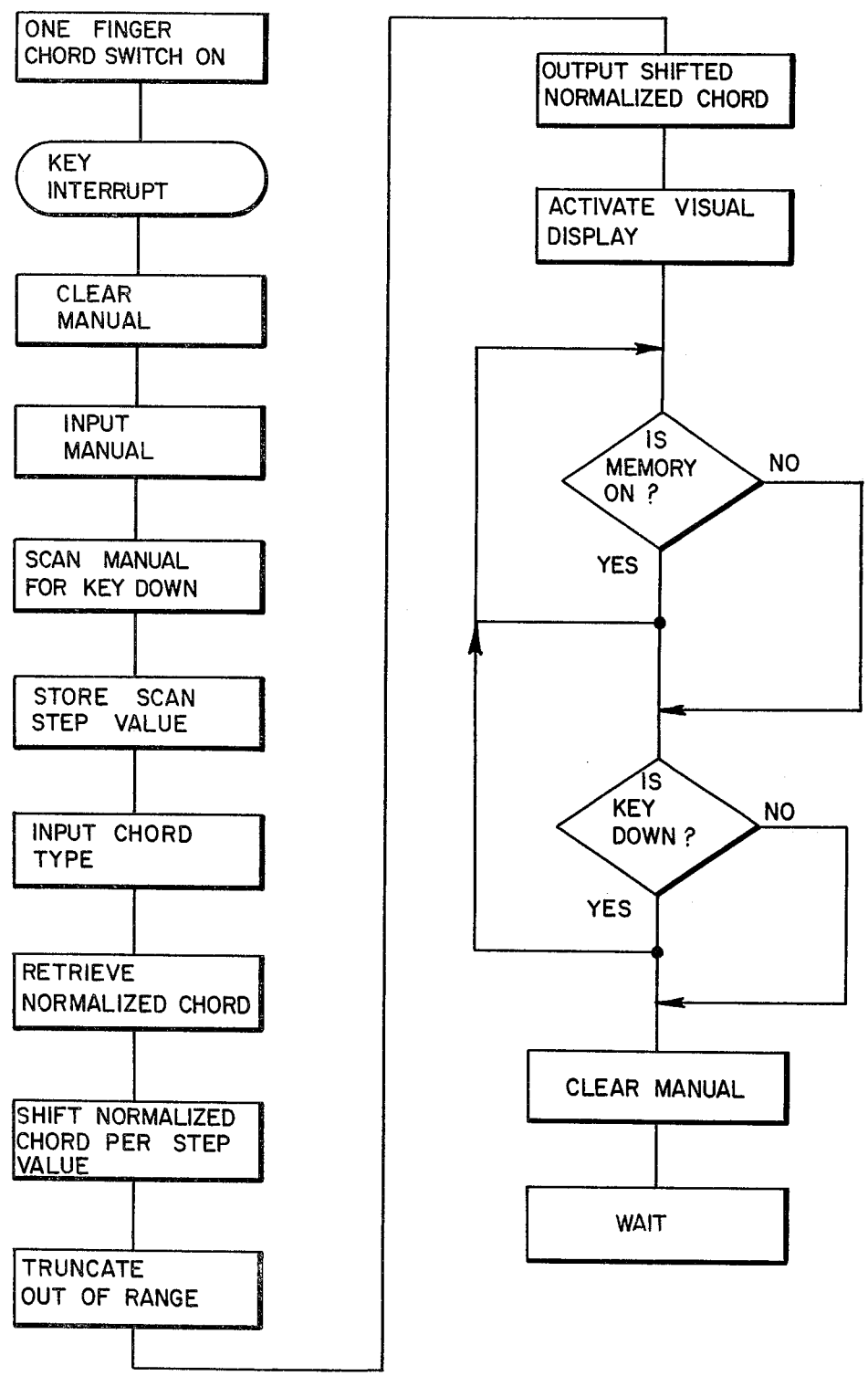
FIG. 4a is a flow chart showing the operation of the chord teaching system in the one finger chord mode.

FIG. 4a is the flow chart for the operation of the system in the one finger chord mode. In this mode the learning organist selects the type of chord to be learned for example major and then selects the alphabetic key by depressing a single key on the lower or left hand manual within the range of keys associated with the chord teaching system. Then the chord teaching system illuminates the visual display light above the depressed key and provides an output signal to the tone generator 22 to play the chord type in the key selected. Therefore the learning organist can simply select various chords and then hear the chords played and see the root or alphabetic note of the chord being played even thought the learning organist may not know the correct finger position for the various chords. This mode of operation encourages the learning organist to compare the sound of the various chord types in the various keys, in particular this mode of operation enables the organist to play and compare the sound of the various keys of the same chord type.

The learning organist selects the one finger chord by turning on the one finger chord switch in mode selector 30 and the type of chord (e.g. major) by turning on the major switch in the chord type switches 38. The microprocessor unit 10 determines the mode of operation by supplying a control signal on line 34 to the disable input of tri-state buffer 32 of mode control 12. The tri-state buffer 32 passes the mode information signal at its input via lines S1–S6 to the peripheral interface data lines D1–D8 and microprocessor unit 10. It should be understood by one of ordinary skill that the microprocessor unit 10 frequently addresses the various input devices as is set forth in detail in the assembly language program below. The system is now activated by the depression of a key on the lower manual keyboard 70 which supplies a key interrupt or legato signal to microprocessor 24 via legato detector 72. In the preferred embodiment only thirteen keys of the lower manual operate with the chord teaching system, namely the key F in the second octave through the key F in the third octave. In standard teaching methods the learning organist is instructed to form all chords within this range of keys and accordingly this range of keys is selected to provide input signals to the chord teaching system. The microprocessor unit 10 receives the key interrupt signal from this range of keys and clears the manual lines by placing a high impedance at the input terminals of microprocessor 24 receiving signals from the keyboard and then inputs the information on the manual lines. The manual lines are scanned beginning with the line corresponding to $F^2$ and continuing through $F^3$ to determine which line has the signal representing the depressed key. The number of steps necessary to locate the manual line with the key depressed signal is stored in the memory of microprocessor 24. Since only manual lines representing keys within the range $F^2$ through $F^3$ are considered if no steps in the scan sequence are needed the step value 0 represents the key of F. Similarly if seven steps are needed before an active line is located the step value 7 represents the key of C. Since the key of F appears within the range twice the step value 13 (thirteen) is equated to the step value 0 (zero).

The microprocessor unit 10 now inputs the chord type information from chord type switches 38 by addressing tri-state buffer 48 via control line 50. The chord type information signals at the input of buffer 48 are now passed to the microprocessor unit 10 via lines CT1–CT4 and peripheral interface data lines D1–D8. The microprocessor unit 10 now retrieves from its memory normalized chord information corresponding to the chord type input (e.g. major).

The musical pattern relationship between notes forming a specific type of chord is uniform. These patterns are not altered if the chord is played in a different key. Therefore, all chord pattern information is normalized to a single key and in the preferred embodiment the key of F is selected. The musical structure for a major triad chord is the root (alphabetic note), a major third (up four half steps from the root), and the fifth (up seven half steps from the root). A half step is the interval between any key and the adjacent key. The frequency ratio between any two notes a half step apart is 1:1.059. A minor triad chord consists of the root note, a minor third (up three half steps from the root), and the fifth. A seventh chord consists of the root note, a major third, the fifth and the flatted seventh (up ten half steps from the root). A major seventh chord consists of the root note, a major third, the fifth and the seventh (up eleven half steps from the root). A minor seventh chord consists of the root note, a minor third, the fifth and the flatted seventh. An augmented chord consists of the root note, a major third, the augmented fifth (up eight half steps from the root). A diminished chord consists of the root, the flattened fifth and the flattened seventh. These mathematical relationships are stored in the memory of microprocessor 24 and referred to as normalized chords or chord type signals.

The retrieved normalized chord information is now shifted in position corresponding to the number of steps counted in the scanning of the manual input. The shifting of the normalized chord information places this information into the alphabetic key selected by the learning organist. For example, if we assume that the chord type selected is the major chord and that the learning organist depresses the $F^2$ key in the range between $F^2$ through $F^3$ resulting in a scan count of zero, then the normalized major chord information is not shifted at all and the ultimate output information from the microprocessor unit 10 to the tone generator would be on the keying lines corresponding to the keys FAC. Accordingly the tone generator unit 22 would play the tones corresponding to the keys FAC (F major chord) and the light above the key F in the visual display unit 16 would be illuminated. If instead the learning organist depresses the C key in the range between $F^2$ through $F^3$ resulting in a scan count of seven, the normalized major chord information is shifted seven steps, so that the original F key information is shifted to the E key, the original A key information is shifted to the C key, and the original C key information is shifted to the G key by going to the twelfth key E in the range, discounting the second F key and beginning to count again at the first F key. In the preferred embodiment, all twenty four output lines of the microprocessor unit 10 to the keyboard are used during the shifting operation. All lines corresponding to the keys forming the normalized chord type are activated. Thus for the major chord type all lines corresponding to the F, A and C keys are activated and the signals of all these lines are shifted in accord with the scan step value. The keyboard lines range from the second octave of the key of C through the third octave of the key of B. Since this range is wider than the thirteen note $F^2$ through $F^3$ range associated with the preferred teaching method, after shifting all the activated lines corresponding to the chord type those activated lines outside the thirteen note range are deactivated or truncated from the tone generator unit 22. Of course, the result obtained in the shifting is the same as the result described above. In an alternative embodiment, if the learning organist also depresses the pedal switch on the mode control switches 30, then the microprocessor unit 10 provides a pedal output signal on the peripheral data interface lines D1–D8 and lines P1—PN to the pedal teaching unit 76. When the pedal teaching unit 76 receives the control signal on line 78 from microprocessor unit 10 it illuminates the light above the pedal corresponding to the root of the selected chord. Therefore, the learning organist can see the correct pedal to be played with the selected chord.

If the memory switch from the mode control 12 is activated by the learning organist the chord selected continues to sound after the depressed key is released. Similarly if the learning organist keeps the selected key depressed the chord continues to sound. If the memory switch is not on and the selected key is released the manual input is cleared and the chord teaching system returns to a ready status and is waiting for the learning organist to select and depress another key within the thirteen note range. The learning organist may depress another key within the thirteen note range associated with the system and the above sequence repeats without the need of depressing a chord type switch since the chord switch depressed in the previous cycle continues to be operative. However, the learning organist can change the chord type by depressing a different chord type switch and then initiate a new cycle in the one finger mode by selecting and depressing a key within the thirteen note range.

Figure 4B:
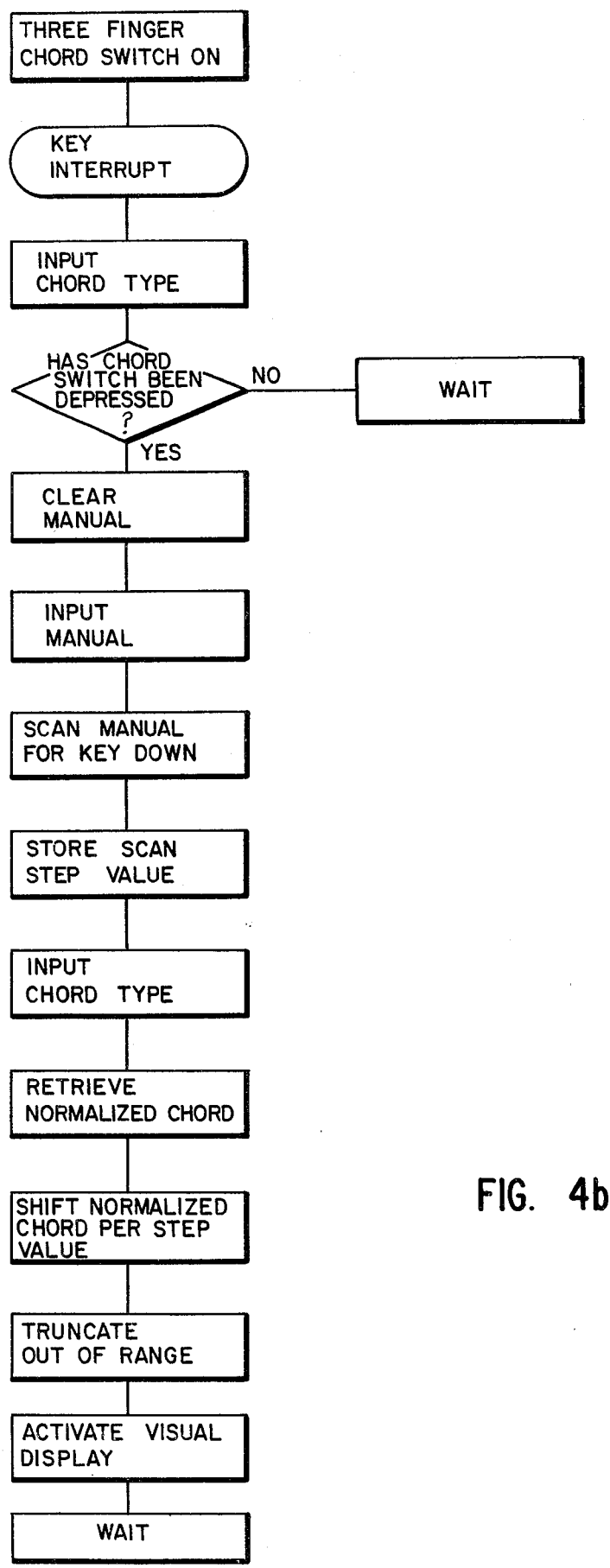
FIG. 4b is a flow chart showing the operation of the chord teaching system in the three finger mode.

FIG. 4b is the flow chart for the operation of the system in the three finger chord mode. The learning organist selects the three finger mode by turning on the three finger switch in the mode selector 30 and selects the type of chord (e.g. major) by turning on the major switch in the chord type switches 38. The microprocessor unit 10 determines the mode of operation by supplying a control signal on line 34 to the buffer 32 of the mode control 12 in the same manner as described above during the one finger mode of operation. Now the learning organist depresses one key within the thirteen note ($F^2$ through $F^3$) range on the lower manual. The resulting key interrupt signal is applied to the microprocessor unit 10 from the key interrupt circuit 72 of keyboard unit 20 and the microprocessor unit inputs the chord type information from chord type switches 38 by providing the control signal on line 50 to the buffer 48. The control signal on line 50 is also applied to the clear terminal of the bistable 46. In the three finger mode bistable 46 also receives at its reset terminal a control signal via line 36 from mode switches 30 indicating that the system is in the three finger chord mode. The information at the input to buffer 48 is passed to the lines CT1–CT4 and via peripheral interface data lines D1–D8 to the microprocessor unit 10. If no chord type switch is depressed the system waits until the learning organist turns a chord type switch on and depresses a key within the thirteen note range. If a chord type switch has been turned on the signal on line CT4 from bistable 46 is used by the microprocessor unit 10 to continue its operational sequence. After the pulse signal on line 50 clears, the output of bistable 46 changes states until another chord type switch is depressed to provide an input via priority circuit 40 and line 44 to the set input of bistable 46. Therefore a new chord type switch must be selected by the learning organist before the three finger mode repeats its cycle. If a chord type switch is initially depressed so that the system continues its operational sequence the microprocessor unit clears the manual input lines and inputs the information regarding the key depressed by the learning organist. The manual lines are scanned to determine which line has the signal representing the depressed key. The number of steps necessary to locate the manual line with the key depressed signal is stored in the memory of microprocessor 24. As discussed above, the number of steps necessary to locate the line with the depressed key signal indicates the alphabetic note of the chord selected by the learning organist.

The microprocessor unit 10 again inputs the chord type information from buffer 48 by providing a control signal on line 50. The microprocessor unit 10 uses the information on lines CT1–CT3 to retrieve from memory the normalized chord information corresponding to the chord type input (e.g. major). The retrieved normalized chord type information is now shifted in position corresponding to the number of steps counted in the scanning of the input key lines. The shifting of the normalized chord information places the normalized chord information into the alphabetic key selected by the learning organist. Any information signals outside the thirteen note range are truncated or deactivated and the chord information within the thirteen note range is applied to the visual display 62 to indicate the keys forming the selected chord. Thus by selecting the chord type and depressing a key on the lower manual corresponding to the alphabetic key desired the learning organist is shown the appropriate notes corresponding to the entire chord. In an alternative embodiment, if the organist also depresses the pedal or Brite Foot switch on the mode control 30, the microprocessor unit 10 provides a pedal output signal on the peripheral interface data lines D1–D8 and lines P1–PN to the pedals teaching unit 76. When the pedal teaching unit 76 receives the control signal on line 78 from microprocessor unit 10 it illuminates the light above the pedal corresponding to the root note of the selected chord.

Figure 4C:
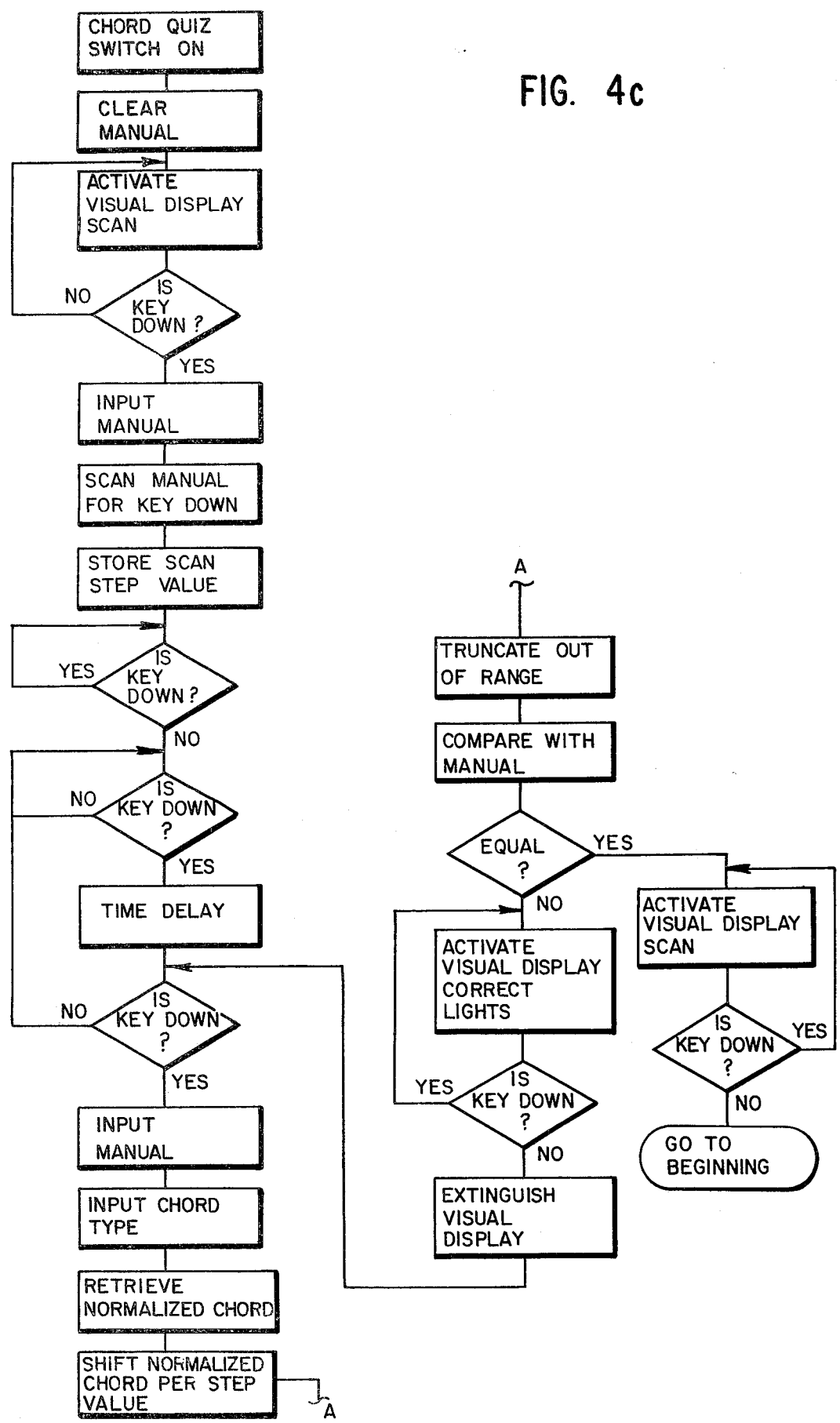
FIG. 4c is a flow chart showing the operation of the chord teaching system in the chord quiz mode.

FIG. 4c is the flow chart for the operation of the system in the chord quiz mode. The learning organist selects the chord quiz mode by turning on the chord quiz switch in mode selector 30 and selects the chord type by turning on a chord type switch 38 (e.g. major). The key input lines from the manual are cleared and the microprocessor unit 10 outputs signals on peripheral interface lines D1–D8 to the latch circuit 66 and on control line 68 to cause each light of the visual display 62 to be illuminated in rapid sequence. The microprocessor unit 10 now determines if the learning organist has depressed a key on the lower manual within the thirteen note range by interrogating the testable input lead connected to the key down detector 74. If no key is depressed the microprocessor unit 10 continues to scan the lights of the visual display 64 causing them to be illuminated in rapid sequence. If a key is depressed within the thirteen note range the information on the key lines is inputed and the microprocessor scans the key lines to determine which key line has a signal repressing a depressed key. The number of scanning steps necessary to locate the key line with the signal is stored in the memory of the microprocessor unit 10.

The microprocessor unit 10 now waits until the learning organist releases the depressed key. The learning organist must now depress all the keys corresponding to the chord type and alphabetic key which were selected. The microprocessor unit 10 now waits for a new key depression by the learning organist in the attempt to produce the selected chord. An appropriate time delay is provided to enable the learning organist to depress the proper keys on the lower manual. At the end of the time delay if the learning organist is not depressing any keys then the microprocessor unit 10 recycles to enable the organist to again select and depress the appropriate keys corresponding to the chosen chord. If the learning organist is depressing keys at the end of the time period the manual key lines are inputed to the microprocessor unit 10. Now the selected chord type information is inputed to the microprocessor unit 10 as described above, the normalized chord information stored in memory is retrieved and shifted a number of times corresponding to the stored scan step value and the out of range information truncated or deleted. The shifted normalized chord information is now compared to the manual input information and if it is the same the microprocessor unit 10 provides an output to the visual display causing the lights to be illuminated in rapid sequence. The lights of the visual display continue to be illuminated in rapid sequence as long as the learning organist maintains the keys depressed. Upon key release the chord teaching system recycles to the beginning to receive another select chord from the learning organist. If the comparison is not equal the microprocessor unit 10 outputs information to the visual display 62 causing the lights to be illuminated above the keys corresponding to the selected chord. The lights stay illuminated as long as the learning organist retains a key depressed. Upon key release the lights of the visual display are extinguished and the microprocessor unit 10 recycles to point A in the flow chart 4c to allow the learning organist to again attempt to depress the correct keys corresponding to the selected chord.

By using the chord quiz mode the learning organist can test his/her ability to play various chords which he/she selects even though the organist does not have to demonstrate the correct finger position in selecting the chord. The organist receives immediate positive reinforcement if the selected chord is properly played. If the selected chord is not properly played the learning organist is shown the correct keys to be depressed and then provided with the opportunity to again try to depress the correct keys. The learning organist can therefore test his/her knowledge of the correct finger position for chords which he/she selects and can progress at his/her own speed.

Figure 4D:
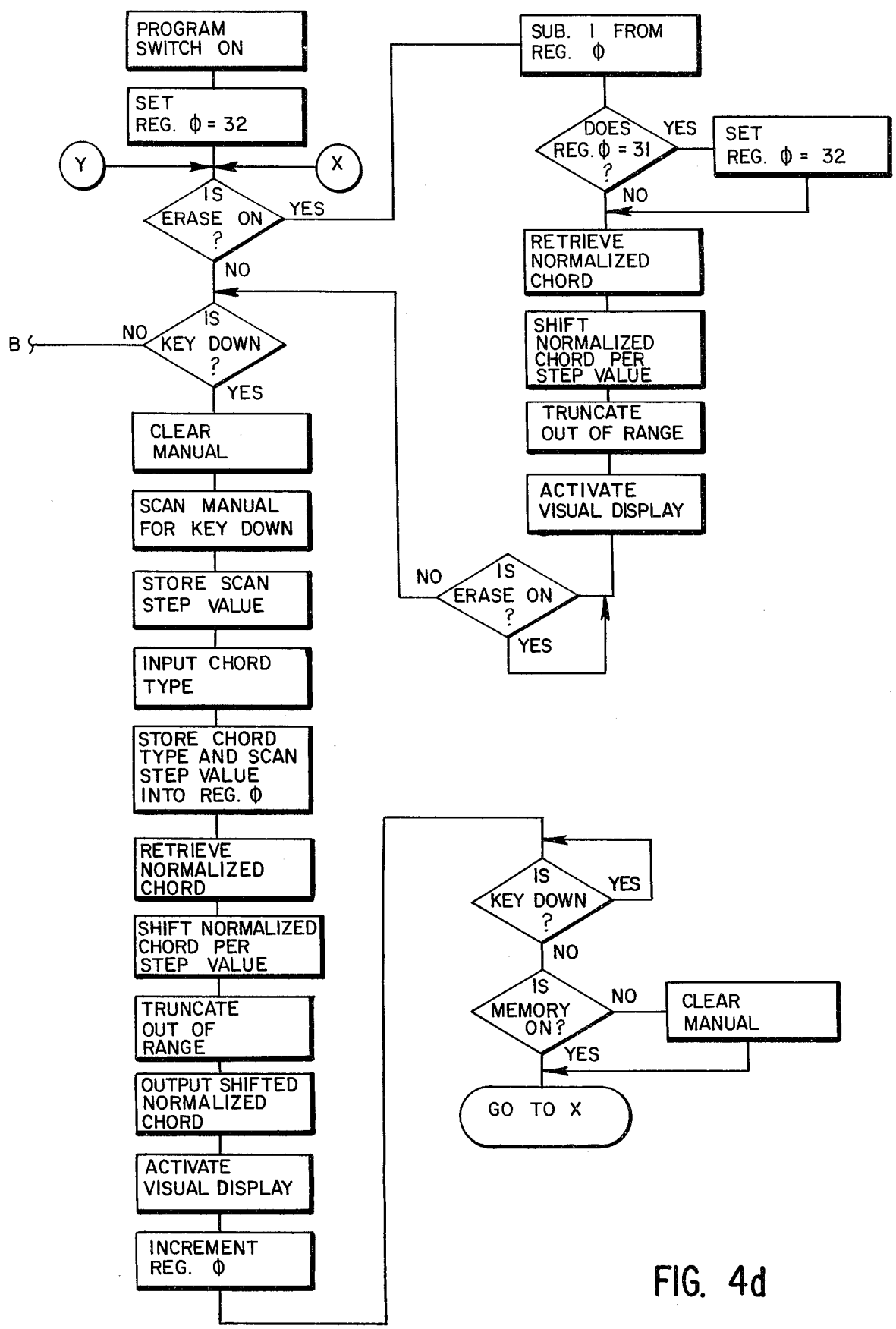
FIGS. 4d and 4d continued is a flow chart showing the operation of the chord teaching system in the program mode.
Figure 4D:
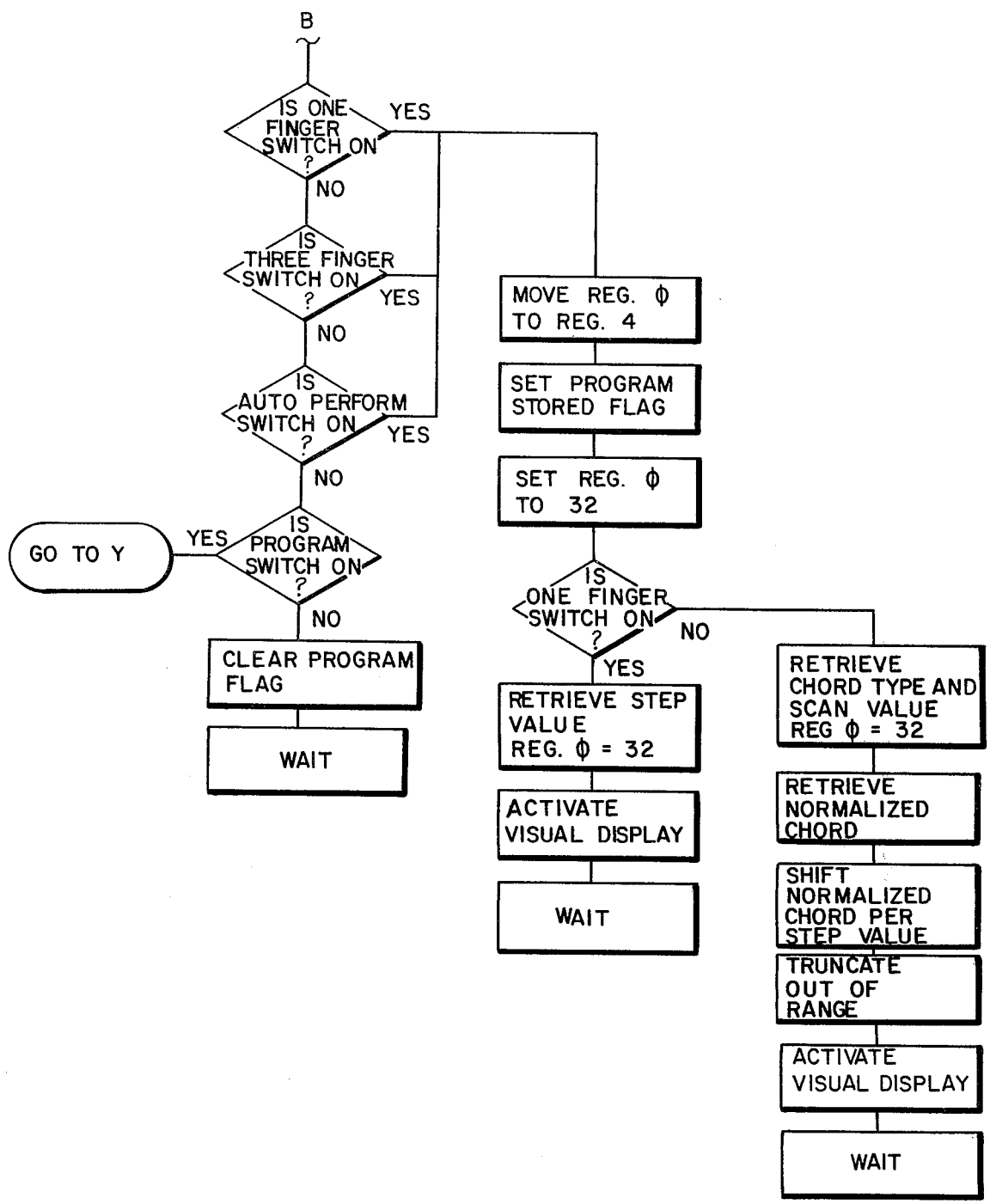

FIG. 4d is the flow chart for the operation of the system in the program mode during which the learning organist places selected chords into the memory of the microprocessor unit 10 for subsequent use. The learning organist selects the program mode by turning on the program switch in mode switches 30. The microprocessor unit 10 sets one of its internal registers Reg 0 to the first memory location for storing chord information referred to as memory location 32.

Before the learning organist is ready to input chord information the microprocessor unit 10 must check to determine if the erase switch is on. The erase or reset switch is among the various mode switches 30 and permits the learning organist to erase the chord information stored in the memory. If the erase switch is on the Reg 0 is set backwards one location. Since the first memory location for chord storage is Reg 0 equals memory location 32, if Reg 0 equals memory location 31 then all stored chord information has been erased and Reg 0 is set so that Reg 0 again equals the first memory location for stored chord information. If Reg 0 does not equal memory location 31, but rather equals a memory location between location 32 and 108 (since a possible 76 chords can be stored) the information stored at that memory location is used to retrieve the normalized chord information stored in the memory of microprocessor unit 10, shift the normalized chord information in accord with the stored step scan value, truncate the out of range signals and illuminate the appropriate lights of the visual display 64. The lights thus illuminated show the chord last stored in the memory of microprocessor 24. Accordingly, if the learning organist has programmed into the memory of the microprocessor unit four chords, the organist can sequentially erase each of those chords from the memory by depressing the erase switch in mode switches 30 four separate times.

If the erase switch is off, the microprocessor unit determines if the learning organist has depressed a key on the lower manual within the thirteen note range. If a key is depressed the manual input lines are cleared and the input signals on the lines received by the microprocessor. The input lines are scanned to determine which line has the signal representing the depressed key. The number of steps necessary to locate the manual line with the key depressed signal is stored in the memory of microprocessor 24.

The microprocessor unit 10 now inputs the chord type information to determine the type of chord selected by the learning organist. The chord type information and the scan step value are stored into the memory location indicated by Reg 0. If this information represents the first selected chord then it would be stored in memory location indicated by Reg 0 equals 32, of course if this information represents the second selected chord then it would be stored in memory location indicated by Reg 0 equals 33. In the preferred embodiment seventy-six chords can be stored for future use by the learning organist.

The microprocessor unit 10 now retrieves the normalized chord information stored in memory corresponding to the chord type information selected by the learning organist, shifts the normalized chord information a number of times equal to the scan step value, truncates the out of range signals, outputs the shifted truncated normalized chord information to both the visual display 64 and tone generator output 22. The learning organist thus hears the selected chord and sees the appropriate keys which must be depressed to play the selected chord.

The microprocessor unit 10 now increments Reg 0 to the next memory location. If the learning organist retains the selected key down the chord continues to sound. If the memory switch in mode switches 30 is on the chord will continue to sound until the learning organist selects another key within the thirteen note range to depress. If the depressed key is released and memory is not on the manual input lines are cleared and the system recycles to point X shown in the flow chart FIG. 4d. The learning organist may now store another chord of the same chord type by depressing another key on the lower manual within the thirteen note range associated with the system or input another chord of a different chord type by first depressing a different chord type switch and then depressing a key within the thirteen note range.

If after Reg 0 is set to memory location 32 the microprocessor unit 10 does not detect a key down signal from the key down detector 74, it checks to determine if the three finger switch, one finger switch or autoperform switch of mode switches 30 are on. If all of these switches are off, it checks to determine if the program switch is still on and if so returns to point Y shown in flow chart 4d. If the program switch is off the microprocessor unit 10 waits for another mode control input to determine its operation.

If any one of the one finger chord, three finger chord or autoperform switches are on then the information in Reg 0 is moved to another Register, Reg 4. Therefore, if three chords have previously been programmed Reg 0 would be equal to 35 and that information, namely that three chords have been stored, is moved to Register 4 so that Reg 4 equals 35 and thus the number of chords stored is retained. New Reg 0 is set equal to memory location 32. If the one finger chord switch is on, the information corresponding to the scan step value in memory location 32 is retrieved and outputed to the visual display 64 to illuminate the key of the first chord stored in the memory. Now the learning organist must follow the sequence set forth hereinafter for operation in the program plus one finger chord.

If after setting Reg 0 equal to 32, the one finger switch is not on, then either the three finger chord or the autoperform switch must be on and information stored in memory location 32 is retrieved. The normalized chord information corresponding to the stored chord type from memory location 32 is retrieved and shifted the appropriate number equal to the scan step value stored in memory location 32. The shifted normalized chord information is truncated and outputed to the visual display to illuminate the keys corresponding to the first stored chord. The learning organist must now follow the sequence for operation in the program plus three finger chord mode or the program plus autoperform mode.

Figure 4E:
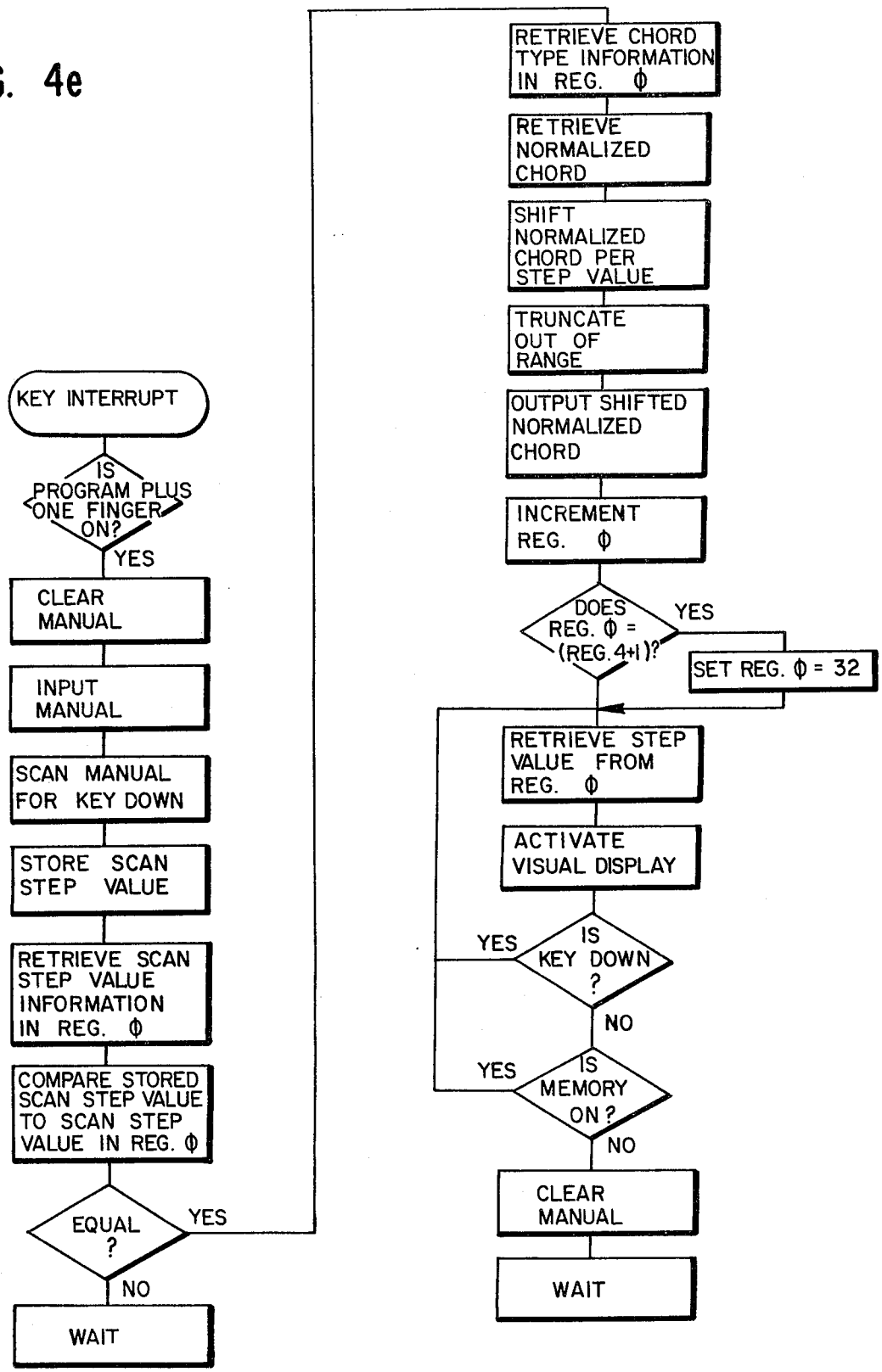
FIG. 4e is a flow chart showing the operation of the chord teaching system in the program plus one finger chord mode.

FIG. 4e is the flow chart for the operation of the system in the program plus one finger chord mode. In this mode of operation the learning organist must depress a key within the thirteen note range which corresponds to the stored chord in order to have the stored chord played. As explained with respect to flow chart 4d with the program switch and the one finger chord switch from mode switches 30 both on the system illuminates the light of the visual display above the key corresponding to the alphabetic note of the first stored chord. The learning organist now depresses a key on the lower manual within the thirteen note range and the microprocessor unit 10 receives the key interrupt signal from legatto detector 72, clears the manual input lines and inputs the signal present on those lines. The input lines are scanned to determine which line has a key signal corresponding to the depressed key and the scan step value is stored in the memory of the microprocessor. The scan step value stored in the memory location indicated by Reg 0 is now retrieved and compared to the stored scan step value of the input lines. If the comparison is not equal the system waits for another key interrupt signal to repeat the above sequence.

If the comparison is equal the chord type information stored in the memory indicated by Reg 0 is retrieved, the normalized chord information identified by the chord type information is retrieved, the normalized chord information is shifted a number of positions equal to the scan step values stored in the memory location indicated by Reg 0. The shifted normalized chord information is truncated and outputed to the tone generator 22 to provide the musical chord.

The register, Reg 0, is now incremented to indicated the next memory location. If the chord just played was the first stored chord then Reg 0 equals 33, the next memory location. The data stored in the memory location indicated by Reg 0 is now compared to the data stored in Reg 4 plus 1. In Reg 4 information equal to the total number of stored chords is retained and accordingly if Reg 0 equal Reg 4 plus 1, then all the stored chords have been played and Reg 0 is set to the memory location of the first stored chord, memory location 32. If the Reg 0 does not equal Reg 4 plus 1 then more chords are stored in the memory and the alphabetic note corresponding to the next chord must be illuminated. Similarly, if Reg 0 is set to the first memory location 32 then the alphabetic note corresponding to the first stored chord must be illuminated. Therefore, the scan step value in the memory location indicated by Reg 0 is retrieved and outputed to the visual display 64. In an alternative embodiment, if the organist also depresses the pedal switch in mode control 30 the microprocessor unit 10 outputs to the pedal teaching unit a pedal output signal to illuminate the light above the pedal corresponding to the stored chord.

If the learning organist retains the depressed key down the entire chord will continue to sound. Similarly, if the memory switch in mode switches 30 is on the chord will continue sounding until another key within the thirteen note range is depressed by the learning organist. If the learning organist releases the depressed key and the memory switch is not on the manual input lines are cleared and the system waits for the microprocessor 24 to receive a key interrupt signal from legato detector 72 indicating that the learning organist has depressed a key within the thirteen note range.

In the program plus one finger chord mode the learning organist can play each chord in a prestored sequence by depressing a single key within a thirteen note range which is indicated as the root note of the stored chord. Thus the learning organist can play the chords of an entire song which were programmed into memory by depressing a series of single keys which are identified one at a time.

Figure 4F:
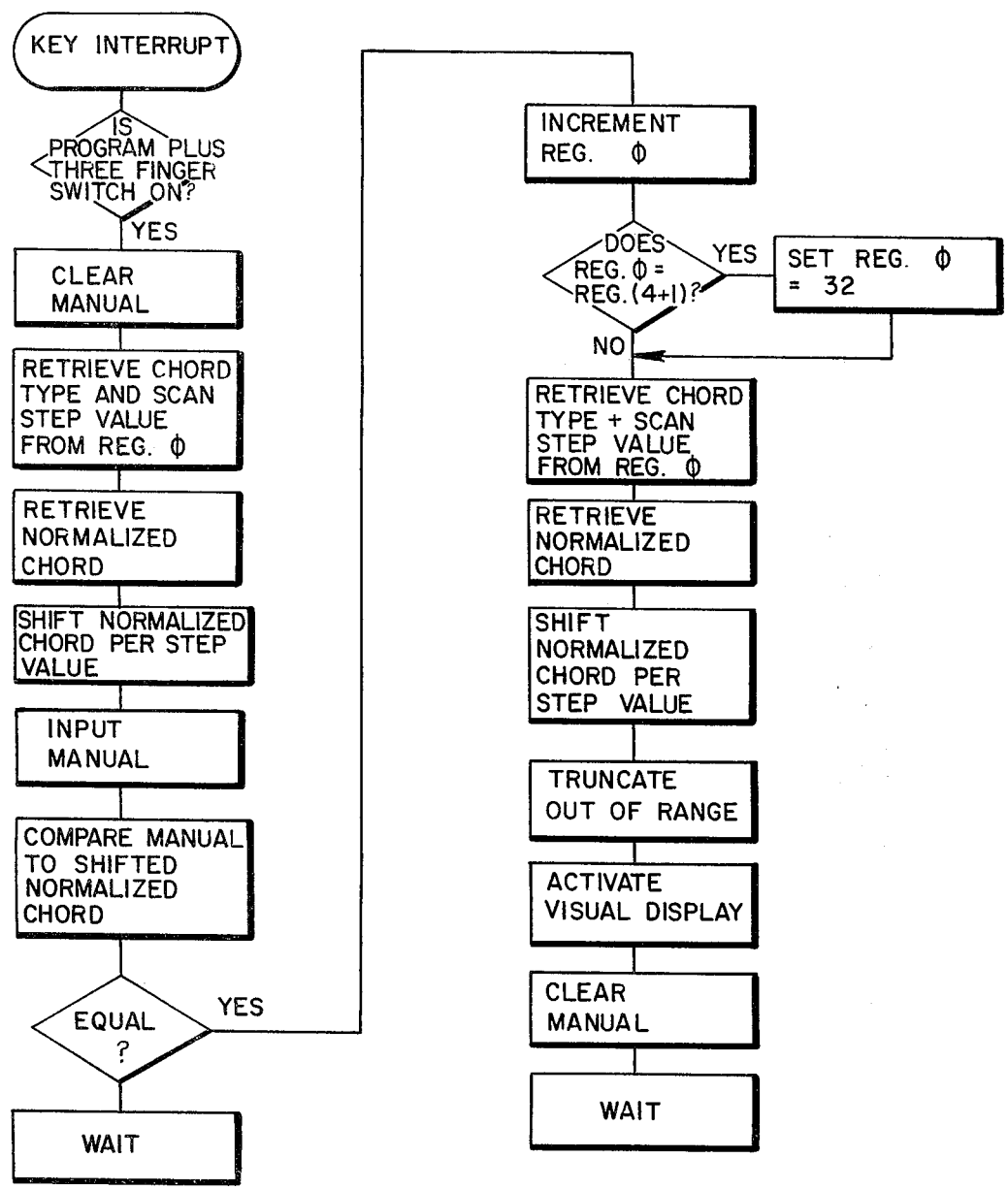
FIG. 4f is a flow chart showing the operation of the chord teaching system in the program plus three finger chord mode.

FIG. 4f is a flow chart for the operation of the system in the program plus three finger mode. In this mode of operation the learning organist must depress a set of keys within the thirteen note range corresponding to the stored chord in order to have the visual display 64 show the next stored chord. As explained with respect to FIG. 4d the first chord stored in memory location Reg 0 equals 32 is illuminated in the visual display 64. The learning organist must now depress the keys within the thirteen note range corresponding to those indicated by the visual display 62. Upon receipt of a key interrupt signal from the legato detector 72 the microprocessor unit 10 clears the manual input lines and inputs the signals on the manual lines. The information stored in the memory location indicated by Reg 0 is retrieved, the corresponding normalized chord information corresponding to the chord type information from memory location indicated by Reg 0 is retrieved, the normalized chord information is shifted a number of positions equal to the scan step value stored in the memory location indicated by Reg 0, the shifted normalized chord information is truncated for out of range signals and compared to the information from the input key lines which corresponds to the keys within the thirteen note range depressed by the learning organist. If the comparison is not equal the system waits for the learning organist to attempt to depress the correct keys within the range and in doing so provide a key interrupt signal to microprocessor 24 from legato detector 72 to start the above described sequence.

If the comparison indicates that the keys depressed by the learning organist are the same as the stored chord in the memory location indiated by Reg 0, then Reg 0 is incremented to indicate the next memory location. The memory location indicated by the incremented Reg 0 is compared to Reg 4 plus 1. Since the information indicating the total number of chords stored is in Reg. 4 if Reg 0 equals the value of Reg 4 plus 1 then all stored chords have been played and the Reg 0 is set to indicate the first memory location 32. If Reg 0 does not equal the value of Reg 4 plus 1 then more chords are stored in the memory and the next chord in the sequence is indicated by the memory location identified by the incremented Reg 0. In either case the information stored in the memory location indicated by Reg 0 is retrieved, the normalized chord information correspnding to the chord type information from the memory location indiated by Reg 0 is retrieved, the normalized chord information is shifted a number of locations equal to the stored scan value stored in the location indicated by Reg 0, the shifted normalized chord information is truncated and outputted to the visual display. The learning organist must now depress the keys within the thirteen note range corresponding to the illuminate keys of the stored chord and the above described cycle is repeated. In an alternative embodiment if the organist also depressed the pedal switch on the mode control 30 the microprocessor provides a pedal output signal to illuminate a pedal light in the pedal teaching unit corresponding to the stored chord. In this embodiment the learning organist does not have to depress the illuminated pedal to have the system cycle.

In the program plus three finger mode the learning organist can develop the correct finger patterns for a variety of chords which are preprogrammed in sequence. Unlike the program plus one finger mode, the program plus three finger mode does not provide signals to the tone generator 22 to produce a musical output. Of course, the tone generator 22 does receive signals corresponding to the keys actually depressed by the learning organist. Thus in this mode of operation the correct finger position of the learning organist is emphasized through the visual sense of the learning organist.

Figure 4G:
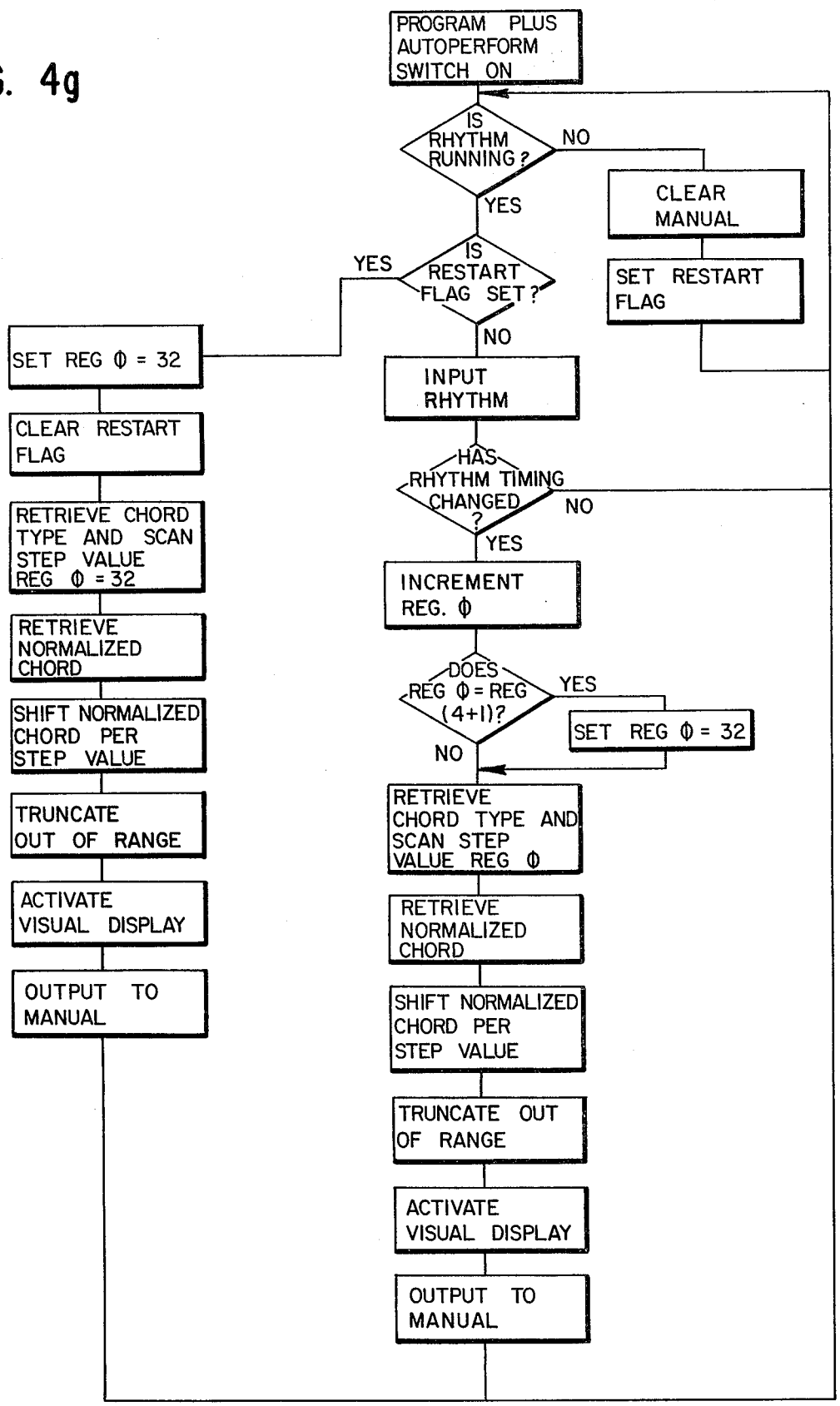
FIG. 4g is a flow chart showing the operation of the chord teaching system in the program plus autoperform mode.

FIG. 4g is a flow chart of the operation of the system in the program plus autoperform mode. In this mode of operation the chord teaching system automatically plays in time with the rhythm beat of the organ a sequence of chords previously stored in memory by the learning organist and illuminates the appropriate lights of the visual display 64 for the chord being played. The learning organist, after programming a sequence of chords into the memory of the microprocessor unit 10, turns on both the program switch and the autoperform switch of the mode switches 30. The microprocessor then determines if the rhythm unit of the organ is running by addressing the tri-state buffer 58 via control line 60. The tri-state buffer passes the signals present at its input to lines R1-R5 and via peripheral interface data lines to microprocessor unit 10. If the rhythm unit is running the signal from line 62 is passed to line R5. However, since the rhythm unit of the organ is not running during the programming of chords into the memory of the chord teaching system, for the first chord played the rhythm unit is not running so the manual input lines are cleared and a restart flag is set within the microprocessor unit 10. Now once the rhythm unit is operating the microprocessor unit 10 determines that the restart flag is set and sets Reg 0 to equal the first memory location 32 and clears the restart flag.

The chord type information and the scan step value information for the chord in the memory indicated by Reg 0 is now retrieved. The normalized chord in the memory of the microprocessor unit 10 corresponding to the chord type information from memory location Reg 0 is retrieved, shifted a number of positions equal to the scan step value from memory location Reg 0, truncated to eliminate out of range signals and outputed via the key lines to the tone generator 22 to sound the first chord stored in memory. If the lights of visual display 64 are not illuminated in accord with the flow chart of FIG. 4d the lights of visual display are illuminated corresponding to the first chord stored in memory, however, the lights of the visual display 64 may be illuminated in accord with the flow chart of FIG. 4d before the chord is sounded. For each stored chord thereafter the lights of the visual display 64 are illuminated as the chord is sounded. In an alternative embodiment, if the learning organist also depresses the pedal switch on the mode control 30 the microprocessor provides a pedal output signal to the pedal teaching unit to display at least the root pedal corresponding to the stored chord. In addition, as would be obvious to one of ordinary skill in the art, the pedal teaching unit can illuminate lights indicating the root and fifth pedal notes in the manner set forth in the above referred to pedal teaching unit.

In the preferred embodiment, the first chord sounds at the first beat of the measure since the rhythm unit begins at beat 1 of a typical measure. Of course, it will be obvious to those of ordinary skill that the chord could be sounded at other times under control of the rhythm unit. If the rhythm unit is running in 4/4 time the first stored chord is sounded at the first beat and the second stored chord is sounded at the third beat of the measure while if the rhythm unit is running in 3/4 time the first chord is sounded at the first beat of the first measure and the second chord is sounded at the first beat of the second measure. The chord playback is controlled by the rhythm unit of the organ. This operation of the system must be followed during the programming function described in FIG. 4d so that if the song to be played is in 4/4 time amd if a whole note is needed then the chord is entered twice since the 4/4 time causes the stored chords to be sounded at the first and third beat of a measure and the double entry results in the sound of a whole note as opposed to two half notes. However, no timing information is stored during the programming the chord and the playback is under the control of the rhythm unit.

The system now recycles to determine if the rhythm unit is running and since the first chord from memory has just been sounded and the rhythm unit is running and the restart flag is cleared the microprocessor unit 10 determines if the rhythm timing has changed to cause a new chord to be played by inputing the rhythm counter signals on lines R1-R4 via peripheral interface input lines D1-D8. For the second chord stored in the memory if the rhythm is at 4/4 time and the rhythm unit is not yet at beat three the system cycles until the rhythm beat reaches the desired amount to indicate the next chord should sound. If the rhythm beat indicated by the signal on lines R1-R4 is at beat three of the first measure the chord stored at the second memory location is retrieved. The register Reg 0 is incremented, for example so that Reg 0 equals 33. If Reg 0 equals Reg 4 plus 1 then all the stored chords have been played and Reg 0 is reset to the first memory location 32. If Reg 0 does not equal Reg 4 plus 1, then the chord type information and the scan step value stored in the memory location indicated by Reg 0 are retrieved, the normalized chord information stored in the memory corresponding to the chord type from the memory location indicated by Reg 0 is retrieved and shifted a number of positions equal to the scan step value from the memory location indicated by Reg 0, truncated to eliminate out of range signals and outputed to the tone generator unit 22 to play the stored musical chord and outputed to the visual display to illuminate the keys of the chord being played. The above sequence repeats until the rhythm unit is turned off.

In this mode of operation the learning organist can listen to a song with the sequence of chords, preprogrammed into memory being played at the proper rhythm time. Furthermore, the learning organist can visually see the keys need to be depressed to actually play the chord being sounded. This type of learning experience enables the organist to develop timing and to appreciate the sound of the chords being played without having to actively play any keys.

A program for the 8049 microprocessor 24 in assembly language to execute the program of the flow charts of FIGS. 4a-4g is as follows:

```
00001               ASMID    AS8048
00004               SECTION  CONTROL,ABSOLUTE
00005               NAME     CONTROL
00006               GLOBAL   FAC,PROGRAM,QUIZ,CHECK,CCD
00007               GLOBAL   COUT,LOAD,SYST,FUNCT
00008               GLOBAL   MCLEAR,OFF,BASS
00009               GLOBAL   LTSOFF,EDS,MEMORY
00010      0000     ORG      0
00011 0000 27       CLR      A
00012 0001 0457     JMP      INIT
00013 0003 1460     CALL     INTR
```

```
00014 0005 C5              SYST    SEL     RB0
00015 0006 1400     >              CALL    FUNCT
00016 0008 B212                    JB5     FACT
00017 000A 37                      CPL     A
00018 000B 9233                    JB4     EDS
00019 000D 37                      CPL     A
00020 000E 1400     >              CALL    PROGRAM
00021 0010 0427                    JMP     MEMORY
00022 0012 37               FACT   CPL     A
00023 0013 85                      CLR     F0
00024 0014 3219                    JB1     FCA
00025 0016 37                      CPL     A ;CHECK FOR 3 FINGER CHORDS
00026 0017 521B                    JB2     CCC
00027 0019 0400     > FCA          JMP     FAC
00028 001B 1400     > CCC          CALL    LTSOFF
00029 001D 1400     > CCD          CALL    LOAD
00030 001F 1400     >              CALL    CHECK
00031 0021 3633                    JT0     EDS
00032 0023 1400     >              CALL    LOAD
00033 0025 1400     >              CALL    COUT
00034 0027 1400     > MEMORY CALL  BASS
00035 0029 1440                    CALL    WATE
00036 002B 7605                    JF1     SYST
00037 002D 2627                    JNT0    MEMORY
00038 002F 4627                    JNT1    MEMORY
00039 0031 1400     >              CALL    MCLEAR
00040 0033 1400     > EDS   CALL   BASS
00041                      ;--------------CHECK FOR QUIZ--------------
00042 0035 1440                    CALL    WATE
00043 0037 7605                    JF1     SYST
00044 0039 37                      CPL     A
00045 003A 7233                    JB3     EDS ; NO QUIZ
00046 003C 1400     >              CALL    QUIZ
00047 003E 0433                    JMP     EDS
00048                      ;-------------------------------------
00049 0040 1400     > WATE  CALL   FUNCT
00050 0042 37                      CPL     A
00051 0043 B246                    JB5     SSS     ; CHECK FOR PROGRAM OFF
00052 0045 85                      CLR     F0      ; RESET IF OFF
00053 0046 37               SSS    CPL     A
00054 0047 43D1                    ORL     A,#0D1H
00055 0049 37                      CPL     A
```

MASTER CONTROL ROUTINE

```
00056 004A 964E                    JNZ     WAT1
00057 004C 1400     >              CALL    LTSOFF
00058 004E 1400     > WAT1  CALL   FUNCT
00059 0050 A5                      CLR     F1
00060 0051 D3DE                    XRL     A,#0DEH ; WANT PROGRAM,
                                                    BUT NOT IF AUTOPERFORM OR 3F
00061 0053 9656                    JNZ     DFG
00062 0055 B5                      CPL     F1
00063 0056 83               DFG    RET
```

```
00064                   ;-------INITIALIZATION ROUTINE-----------
00065 0057 B97D   INIT   MOV    R1,#7DH
00066 0059 A1            MOV    @R1,A
00067 005A C9            DEC    R1
00068 005B B180          MOV    @R1,#00H
00069 005D 05            EN     I
00070 005E 0433          JMP    EDS
00071                   ;-------INTERRUPT ROUTINE---------
00072 0060 1400   ) INTR CALL   MCLEAR
00073 0062 8662   LOOP   JNI    LOOP
00074 0064 93            RETR
00075
```

Symbol Table

CONTROL Section Absolute (0065)

```
    CCC ---- 001B         CCD ---- 001D G
    FCA ---- 0019         INIT --- 0057
    SSS ---- 0046         SYST --- 0005 G

DFG ---- 0056         EDS ---- 0033 G
    INTR --- 0060         LOOP --- 0062
    WAT1 --- 004E         WATE --- 0040
```

BASS Unbound Global

CHECK Unbound Global

COUT Unbound Global

FAC Unbound Global

FUNCT Unbound Global

LOAD Unbound Global

LTSOFF Unbound Global

MCLEAR Unbound Global

OFF Unbound Global

PROGRAM Unbound Global

QUIZ Unbound Global

FIND-A-CHORD SUBROUTINE

```
00003                   ASMID   AS0048
00004                   NAME    FAC
00005                   SECTION FAC,INFACE
00006                   GLOBAL  SUB5,SUB3,COUT,SUB4,SUB6,CCD
00007                   GLOBAL  LITES,LTSOFF,CLRKB,FUNCT,MEMORY,EDS
```

```
00008 0000 B820              MOV     R0,#32
00009 0002 1400     )         CALL    FUNCT
00010 0004 37                 CPL     A
00011 0005 5213     )         JB2     THRF
00012 0007 1400     )         CALL    SUB5 ; GET FACRD
00013 0009 7611     )         JF1     QUIT ; MONOTES DOWN
00014 000B 1400     )         CALL    SUB3;PREPARE PEDAL
00015 000D 1400     )         CALL    COUT
00016 000F 1400     )         CALL    SUB4
00017 0011 0400     )  QUIT   JMP     MEMORY
00018                         ;----------THREE FINGER ROUTINE----------------
00019 0013 2330        THRF   MOV     A,#30H
00020 0015 3A                 OUTL    P2,A
00021 0016 0F                 MOVD    A,P7
00022 0017 9A00               ANL     P2,#0H
00023 0019 37                 CPL     A
00024 001A 721E     )         JB3     CLITES ; IF BIT 3 IS A ZERO
                                             CHANCE LITES,
00025 001C 0400     )         JMP     CCD    ; OTHERWISE CONTINUE
                                             NORMAL PLAYING
00026 001E 1400     ) CLITES  CALL    SUB5
00027 0020 7611     )         JF1     QUIT
00028 0022 1400     )         CALL    LTSOFF
00029 0024 1400     )         CALL    LITES
00030 0026 0400     )         JMP     EDS
00031
```

Symbol Table

FAC Section Inpage (0028)

CLITES - 001E         QUIT --- 0011         THRF --- 0013

CCD Unbound Global

CLRKB Unbound Global

COUT Unbound Global

EDS Unbound Global

FUNCT Unbound Global

LITES Unbound Global

LTSOFF Unbound Global

MEMORY Unbound Global

SUB3 Unbound Global

SUB4 Unbound Global

SUB5 Unbound Global

SUB6 Unbound Global

PROGRAM ROUTINE

```
00003                         ASMID    AS8048
00004                         NAME     PROGRAM
00005                         SECTION  PROGRAM,INPAGE
00006                         GLOBAL   SHIFT,SHFT,COUT,SYST
00007                         GLOBAL   LITES,FACRD,FCSHFT,COMPAR,OFF,PRFM2
00008                         GLOBAL   LTSOFF,MCLEAR,FUNCT,PERFRM
00009                         GLOBAL   DELAY,SUB5,SUB6,SUB2
00010 0000 3204     >         JB1      SAF
00011 0002 0400     >         JMP      PRFM2
00012 0004 5208     > SAF     JB2      SDF
00013 0006 0400     >         JMP      PRFM2
00014 0008 B64F     > SDF     JF0      RESDT
00015 000A 1400     > RESTRT  CALL     OFF
00016 000C B820             MOV      R0,#32
00017 000E 15       BEG     DIS      I
00018 000F 85               CLR      F0
00019 0010 1400     >         CALL     FUNCT
00020 0012 B238     >         JB5      QUIT
00021 0014 37                CPL      A
00022 0015 1219     >         JB0      NBKUP
00023 0017 043A     >         JMP      BKUP
00024 0019 37       NBKUP   CPL      A
00025 001A D3DE             XRL      A,#0DEH
00026 001C 9653     >         JNZ      RTY
00027 001E 560E     > SPT     JT1      BEG
00028 0020 1400     >         CALL     OFF
00029                         ;CHECK FOR MAXIMUM OF 32 CHORDS ENTERED
00030 0022 F8               MOV      A,R0
00031 0023 D36C             XRL      A,#108 ; END OF CHORD STORAGE
00032 0025 C60E     >         JZ       BEG
00033                         ;-------------------------------------
00034 0027 1400     >         CALL     SUB5 ; GET FACRD
00035 0029 760E     >         JF1      BEG ; JUMP IF NONOTES WERE FOUND DOWN
00036 002B 18               INC      R0
00037 002C 1400     >         CALL     COUT
00038 002E 1400     >         CALL     LITES
00039 0030 4630     > DKO     JNT1     DKO ; RECYCLE UNTIL NO KEYDOWN
00040                         ;----------MEMORY--------
00041 0032 260E     >         JNT0     BEG
00042 0034 1400     >         CALL     MCLEAR
00043 0036 040E     >         JMP      BEG
00044 0038 05       QUIT    EN       I
00045 0039 83               RET
00046                         ;-----------RESET BACK ONE COUNT---
00047 003A F8       BKUP    MOV      A,R0
00048 003B 37               CPL      A
00049 003C 0322             ADD      A,#34
00050 003E F60A     >         JC       RESTRT
00051 0040 1400     > HJK     CALL     DELAY
00052 0042 1400     >         CALL     FUNCT
00053 0044 1240     >         JB0      HJK
00054 0046 F0               MOV      A,@R0
```

PROGRAM ROUTINE

```
00055 0047 C8                      DEC    R0
00056 0048 C8                      DEC    R0
00057 0049 C8                      DEC    R0
00058 004A 1400    )               CALL   SUB2
00059 004C 18                      INC    R0
00060 004D 040E    )               JMP    BEG
00061                    ;-----------RESDT------
00062 004F FC             RESDT    MOV    A,R4
00063 0050 A8                      MOV    R0,A
00064 0051 040E    )               JMP    BEG
00065                    ;------------LEAVE PROGRAM TO LIGHT FIRST CHORD-----
00066 0053 F8             RTY      MOV    A,R0
00067 0054 AC                      MOV    R4,A
00068 0055 95                      CPL    F0
00069 0056 05                      EN     1
00070 0057 0400    )               JMP    PERFRM
00071
```

Symbol Table

PROGRAM Section Inpage (0059)

```
    BEG  ---- 000E        BKUP ---- 003A
    QUIT ---  0038        RESDT --  004F
    SDF  ---- 0008        SPT  ---- 001E
    DKO  ---- 0030        HJK  ---- 0040
    RESTRT -  000A        RTY  ---- 0053
```

COMPAR Unbound Global

COUT Unbound Global

DELAY Unbound Global

FACRD Unbound Global

FCSHFT Unbound Global

FUNCT Unbound Global

LITES Unbound Global

LTSOFF Unbound Global

MCLEAR Unbound Global

OFF Unbound Global

PERFRM Unbound Global

PRFM2 Unbound Global

SHFT Unbound Global

SHIFT Unbound Global

SUB2 Unbound Global

SUB5 Unbound Global

SUB6 Unbound Global

SYST Unbound Global

PERFORM ROUTINE

```
00003                           ASMID    AS8048
00004                           NAME     PERFRM
00005                           SECTION  PERFRM,INPAGE
00006                           GLOBAL   COMPAR,COMPR1,LITES,OFF,PRFM2
00007                           GLOBAL   FACRD,FCSHFT,BFOOT,SUB6
00008                           GLOBAL   COUT,SHFT,LTSOFF,MCLEAR
00009                           GLOBAL   LOAD,CHECK
00010                           GLOBAL   SUB1,SUB2,SUB3,SUB4,SUB5
00011                           GLOBAL   CLRKB,SHIFT,FUNCT
00012 0000 1400        )        CALL     MCLEAR
00013 0002 B81F                 MOV      R0,#31
00014 0004 1400        )        CALL     FUNCT
00015 0006 37                   CPL      A
00016 0007 322E        )        JB1      BERG
00017 0009 1492        )        CALL     SUB2 ; ADVANCE 3 FINGER LITES
00018 000B 1400        ) PRFM2  CALL     FUNCT
00019 000D 15                   DIS      I
00020 000E 37                   CPL      A
00021 000F 322E        )        JB1      BERG
00022 0011 147B        )        CALL     SUB1 ; GET CHORD
00023 0013 14BB        )        CALL     SUB4
00024 0015 1400        )        CALL     COMPR1 ; COMPARE TO MANUAL
00025 0017 7620        )        JF1      RTY ; JUMP IF EQUAL
00026 0019 05                   EN       I
00027 001A 1400        )        CALL     LOAD
00028 001C 1400        )        CALL     CHECK
00029 001E 0424        )        JMP      DFG
00030 0020 14A2        ) RTY    CALL     SUB3 ; PREPARE PROPER PEDAL NOTE
00031 0022 1492        )        CALL     SUB2 ; ADVANCE LIGHTS
00032 0024 1400        ) DFG    CALL     BFOOT
00033 0026 1400        )        CALL     LOAD
00034 0028 362C        )        JT0      FIN
00035 002A 1400        )        CALL     COUT
00036 002C 05          FIN      EN       I
00037 002D 83                   RET
00038                           ;-------BERG ONE FINGER--------
00039 002E F8          BERG     MOV      A,R0
00040 002F D31F                 XRL      A,#31
00041 0031 C644        )        JZ       CKIP
00042 0033 1400        )        CALL     COMPR1
00043 0035 7639        )        JF1      NCHRD
```

```
00044 0037 042C    )         JMP    FIN
00045 0039 14A2    )  NCHRD  CALL   SUB3 ; PREPARE PEDAL
00046 003B 147B    )         CALL   SUB1 ; MAKE 1FINGER CHORD
00047 003D 1400    )         CALL   COUT
00048 003F 18                INC    R0
00049 0040 FC                MOV    A,R4
00050 0041 D8                XRL    A,R0
00051 0042 9646   )          JNZ    NXT
00052 0044 B820       SKIP   MOV    R0,#32 ; LIGHT UP NEXT 1FINGER NOTE
00053 0046 1400   )   NXT    CALL   BFOOT
00054                        ;--------LIGHT UP OFC NOTE LIGHT--------
```

PERFORM ROUTINE

```
00055 0048 BDFF       SUB4   MOV    R5,#255
00056 004A BEFF              MOV    R6,#255
00057 004C BFFB              MOV    R7,#0FBH
00058 004E F0                MOV    A,@R0
00059 004F 53F0              ANL    A,#0F0H
00060 0051 47                SWAP   A
00061 0052 37                CPL    A
00062 0053 030E              ADD    A,#14
00063 0055 A9                MOV    R1,A
00064 0056 1400   )   SST    CALL   SHFT
00065 0058 E956   )          DJNZ   R1,SST
00066 005A 1400   )          CALL   LTSOFF
00067 005C 1400   )          CALL   LITES
00068 005E 05                EN     I
00069 005F 83                RET
00070                        ;----------PREPARE FAC INTO R5,6,7-------
00071                        ;--------ON TEACH AND TEST AND FAC----------
00072 0060 1400   )   SUB5   CALL   LOAD
00073 0062 1400   )          CALL   CLRKB
00074 0064 B900              MOV    R1,#0
00075 0066 1400   )          CALL   SHIFT
00076 0068 B5                CPL    F1
00077 0069 7691   )          JF1    FIN3
00078 006B F9                MOV    A,R1
00079 006C 03FB              ADD    A,#0FBH
00080 006E 47                SWAP   A
00081 006F A0                MOV    @R0,A
00082 0070 1400   )          CALL   BFOOT
00083 0072 2330              MOV    A,#30H ;GO GET CHORD TYPE
00084 0074 3A                OUTL   P2,A
00085 0075 0F                MOVD   A,P7
00086 0076 5307              ANL    A,#07H
00087 0078 30                XCHD   A,@R0
00088 0079 27                CLR    A
00089 007A 3A                OUTL   P2,A
00090                        ;------CHANGE CHORD-------------------
00091 007B F0         SUB1   MOV    A,@R0
00092 007C 530F              ANL    A,#0FH
00093 007E 1400   )          CALL   FACRD
00094 0080 F0                MOV    A,@R0
00095 0081 53F0              ANL    A,#0F0H
```

```
00096 0083 47                    SWAP    A
00097 0084 0305                  ADD     A,#5
00098 0086 1400   )              CALL    FCSHFT
00099 0088 F0                    MOV     A,@R0
00100 0089 C691   )              JZ      FIN3
00101 008B D3C0                  XRL     A,#0C0H
00102 008D C691   )              JZ      FIN3
00103 008F 14BB   )              CALL    SUB6
00104 0091 83            FIN3    RET
00105                    ;--------PREPARE AND LITE 3 FINGER LITES----
00106 0092 1400   ) SUB2          CALL    LTSOFF
```

PERFORM ROUTINE

```
00107 0094 18                    INC     R0
00108 0095 FC                    MOV     A,R4
00109 0096 D8                    XRL     A,R0
00110 0097 969B   )              JNZ     SAP
00111 0099 B820                  MOV     R0,#32
00112 009B 147B   ) SAP          CALL    SUB1
00113 009D 14BB   )              CALL    SUB6
00114 009F 1400   )              CALL    LITES
00115 00A1 83                    RET
00116                    ;----------PREPARE SINGLE FINGER PEDAL--
00117 00A2 B97E       SUB3       MOV     R1,#126
00118 00A4 F0                    MOV     A,@R0
00119 00A5 53F0                  ANL     A,#0F0H
00120 00A7 47                    SWAP    A
00121 00A8 AA                    MOV     R2,A
00122 00A9 03F9                  ADD     A,#0F9H
00123 00AB F6B0   )              JC      SAT
00124 00AD FA                    MOV     A,R2
00125 00AE 0305                  ADD     A,#05H
00126 00B0 A1         SAT        MOV     @R1,A
00127 00B1 C9                    DEC     R1
00128 00B2 C9                    DEC     R1
00129 00B3 A1                    MOV     @R1,A
00130 00B4 B97F                  MOV     R1,#127
00131 00B6 F0                    MOV     A,@R0
00132 00B7 530F                  ANL     A,#0FH
00133 00B9 A1                    MOV     @R1,A
00134 00BA 83                    RET
00135                    ;-------CANCEL LOW F NOTE OR LIGHT---------
00136 00BB F0         SUB6       MOV     A,@R0
00137 00BC D304                  XRL     A,#04H
00138 00BE C6CF   )              JZ      LOWF
00139 00C0 F0                    MOV     A,@R0
00140 00C1 D3C4                  XRL     A,#0C4H
00141 00C3 C6CF   )              JZ      LOWF
00142 00C5 F0                    MOV     A,@R0
00143 00C6 D335                  XRL     A,#05H ; AFLAT 6TH
00144 00C8 C6CF   )              JZ      LOWF
00145 00CA FD                    MOV     A,R5
00146 00CB 4320                  ORL     A,#20H
```

```
00147 00CD AD              MOV    R5,A
00148 00CE 83              RET
00149 00CF FF       LOWF   MOV    A,R7
00150 00D0 4302            ORL    A,#02H
00151 00D2 AF              MOV    R7,A
00152 00D3 83              RET
00153
```

Symbol Table

PERFRM Section Inpage (00D4)

```
    BERG  --- 002E          DFG   --- 0024
    NCHRD --  0039          NXT   --- 0046
    SAT   --- 00B0          SKIP  --- 0044
    SUB3  --- 00A2 G        SUB4  --- 0048 G
    FIN   --- 002C          FIN3  --- 0091
    PRFM2 --  000B G        RTY   --- 0020
    SST   --- 0056          SUB1  --- 007B G
    SUB5  --- 0060 G        SUB6  --- 00BB G
```

BFOOT Unbound Global

CHECK Unbound Global

CLRKB Unbound Global

COMPAR Unbound Global

COMPR1 Unbound Global

COUT Unbound Global

FACRD Unbound Global

FCSHFT Unbound Global

FUNCT Unbound Global

LITES Unbound Global

LOAD Unbound Global

LTSOFF Unbound Global

MCLEAR Unbound Global

OFF Unbound Global

SHFT Unbound Global

SHIFT Unbound Global

QUIZ FEATURE

```
00003                          \SMID    AS8048
00004                          NAME     QUIZ
00005                          SECTION  QUIZ,INPAGE
00006                          GLOBAL   LITES,SUB5,SUB6,LTSOFF
00007                          GLOBAL   COMPAR,OUTCL
00008                          GLOBAL   FUNCT,DELAY
00009 0000 15                  DIS      I
00010 0001 1400  )  BEG        CALL     FUNCT
00011 0003 7231  )             JB3      QUIT
00012 0005 1433  )             CALL     LSCAN
00013 0007 5601  )             JT1      BEG
00014 0009 B820                MOV      R0,#32
00015 000B 1400  )             CALL     SUB5 ; LOAD FAC
00016 000D 1400  )             CALL     SUB6
00017 000F 7601  )             JF1      BEG ; NONOTES
00018 0011 1400  )  SPL        CALL     FUNCT
00019 0013 7231  )             JB3      QUIT
00020 0015 5611  )             JT1      SPL
00021 0017 B83C                MOV      R0,#60
00022 0019 1400  )  ASS        CALL     DELAY
00023 001B E819  )             DJNZ     R0,ASS
00024 001D 1400  )  STP        CALL     COMPAR
00025 001F 762B  )             JT1      NEW
00026                          ;----------------FAILURE ROUTINE
00027 0021 5611  )             JT1      SPL
00028 0023 1400  )             CALL     LITES
00029 0025 1400  )             CALL     DELAY
00030 0027 1400  )             CALL     LTSOFF
00031 0029 041D  )             JMP      STP
00032 002B 1433  )  NEW        CALL     LSCAN
00033 002D 5601  )             JT1      BEG
00034 002F 042B  )             JMP      NEW
00035 0031 05       QUIT       EN       I
00036 0032 83                  RET
00037                          ;---------SUBROUTINES-----------
00038 0033 B800     LSCAN      MOV      R0,#0
00039 0035 F8       SP         MOV      A,R0
00040 0036 3F                  MOVD     P7,A
00041 0037 2340                MOV      A,#40H
00042 0039 1400  )             CALL     OUTCL
00043 003B 18                  INC      R0
00044 003C 1400  )             CALL     DELAY
00045 003E F8                  MOV      A,R0
00046 003F D310                XRL      A,#16
00047 0041 9635  )             JNZ      SP
00048 0043 83                  RET
00049
```

Symbol Table

QUIZ Section Inpage (0044)

ASS ---- 0019           BEG ---- 0001

```
SP  ----- 0035            SPL ---- 0011
LSCAN -- 0033             NEW ---- 002B
STP ---- 001D
```

COMPAR Unbound Global

DELAY Unbound Global

FUNCT Unbound Global

LITES Unbound Global

LTSOFF Unbound Global

OUTCL Unbound Global

SUB5 Unbound Global

SUB6 Unbound Global

THIS IS A FILE OF UTILITY S

```
00003                         SECTION UTILITY,INPAGE
00004                         ASMID   AS8048
00005                         GLOBAL  SHIFT,SHFT,COUT,LOAD
00006                         GLOBAL  ALOAD,CLOAD,FUNCT,ARPEOP
00007                         NAME    UTILITY
00008                    ;ROUTINE FOR COUNING INITIAL MANUAL SHIFTING
00009 0000 A5        SHIFT    CLR     F1
00010 0001 19                 INC     R1
00011 0002 140E   >           CALL    SHFT
00012 0004 F9                 MOV     A,R1
00013 0005 D318               XRL     A,#24
00014 0007 C60D   >           JZ      KWIT
00015 0009 FD                 MOV     A,R5
00016 000A 1200   >           JB0     SHIFT
00017 000C B5                 CPL     F1
00018 000D 83         KWIT    RET
00019                    ;ROUTINE FOR SHIFTING NOTES TO MANUAL LEFT DIRECTION
00020 000E 97         SHFT    CLR     C
00021 000F A7                 CPL     C
00022 0010 FF                 MOV     A,R7
00023 0011 67                 RRC     A
00024 0012 AF                 MOV     R7,A
00025 0013 FE                 MOV     A,R6
00026 0014 67                 RRC     A
00027 0015 AE                 MOV     R6,A
00028 0016 FD                 MOV     A,R5
00029 0017 67                 RRC     A
00030 0018 AD                 MOV     R5,A
00031 0019 F61F   >           JC      FK
00032 001B FF                 MOV     A,R7
00033 001C 537F               ANL     A,#7FH
00034 001E AF                 MOV     R7,A
00035 001F 83         FK      RET
```

```
00036                    ;ROUTINE FOR LOADING IN MANUAL INFORMATION
00037 0020 09      LOAD  IN     A,P1
00038 0021 AD            MOV    R5,A
00039 0022 08            INS    A,BUS
00040 0023 AE            MOV    R6,A
00041 0024 0C            MOVD   A,P4
00042 0025 AF            MOV    R7,A
00043 0026 0D            MOVD   A,P5
00044 0027 47            SWAP   A
00045 0028 4F            ORL    A,R7
00046 0029 AF            MOV    R7,A
00047 002A B96F    CONT  MOV    R1,#111 ; HIGH NOTE ARP STORAGE
00048 002C 143E  )       CALL   ALOAD
00049 002E A1            MOV    @R1,A
00050 002F 1448  )       CALL   CLOAD
00051 0031 C9            DEC    R1
00052 0032 A1            MOV    @R1,A
00053 0033 83            RET
00054                    ;ROUTINE FOR OUTPUTING MNAUAL INFORMATION
```

THIS IS A FILE OF UTILITY S

```
00055 0034 FD      COUT  MOV    A,R5
00056 0035 39            OUTL   P1,A
00057 0036 FE            MOV    A,R6
00058 0037 02            OUTL   BUS,A
00059 0038 FF            MOV    A,R7
00060 0039 3C            MOVD   P4,A
00061 003A 47            SWAP   A
00062 003B 3D            MOVD   P5,A
00063 003C 042A  )       JMP    CONT
00064                    ;ROUTINE FOR ARP AND CHORD CHECK COMPRESSION
00065                    ;          COMPRESS UPPER 4 NOTES
00066 003E FE      ALOAD MOV    A,R6
00067 003F 43F0          ORL    A,#0F0H
00068 0041 AB            MOV    R3,A
00069 0042 FF            MOV    A,R7
00070 0043 47            SWAP   A
00071 0044 43F0          ORL    A,#0F0H
00072 0046 5B            ANL    A,R3
00073 0047 83            RET
00074                    ;--------------COMPRESS DOWN LOWER 8 NOTES---/
00075 0048 FE      CLOAD MOV    A,R6
00076 0049 430F          ORL    A,#15
00077 004B 47            SWAP   A
00078 004C 5D            ANL    A,R5
00079 004D AB            MOV    R3,A
00080 004E FF            MOV    A,R7
00081 004F 43F0          ORL    A,#0F0H
00082 0051 47            SWAP   A
00083 0052 5B            ANL    A,R3
00084 0053 83            RET
00085                    ;--------LOAD FUNCTIONS---------
00086 0054 2370    FUNCT MOV    A,#70H
00087 0056 045A  )       JMP    DGF
00088 0058 2380    ARPEOF MOV   A,#80H
```

```
00089 005A 3A         DGF     OUTL    P2,A
00090 005B 0E                 MOVD    A,P6
00091 005C 4308               ORL     A,#08H   ; CLEAR BREAK INPUT/
00092 005E 47                 SWAP    A
00093 005F AA                 MOV     R2,A
00094 0060 0F                 MOVD    A,P7
00095 0061 4A                 ORL     A,R2
00096 0062 AA                 MOV     R2,A
00097 0063 27                 CLR     A
00098 0064 3A                 OUTL    P2,A
00099 0065 FA                 MOV     A,R2
00100 0066 83                 RET
00101
```

Symbol Table

UTILITY Section Inpage (0067)

```
    ALOAD -- 003E G        ARPEOP - 0058 G
    DGF  ---- 005A         FK ----- 001F
    SHFT ---- 000E G       SHIFT -- 0000 G
    CLOAD -- 0048 G        CONT --- 002A
    FUNCT -- 0054 G        KWIT --- 000D
```

LITE OUTPUT ROUTINE

```
00003                              ASMID   AS8048
00004                              NAME    LITES
00005                              SECTION LITES,INPAGE
00006                              GLOBAL  SHFT,OUTCL
00007 0000 B905                    MOV     R1,#5
00008 0002 1400     )   SSS        CALL    SHFT
00009 0004 E902     )               DJNZ    R1,SSS
00010 0006 1400     )   SB         CALL    SHFT
00011 0008 F610     )               JC      SST
00012 000A F9                       MOV     A,R1
00013 000B 3F                       MOVD    P7,A
00014 000C 2340                     MOV     A,#40H
00015 000E 1400     )               CALL    OUTCL
00016 0010 19           SST        INC     R1
00017 0011 F9                       MOV     A,R1
00018 0012 D30D                     XRL     A,#13
00019 0014 9606     )               JNZ     SB
00020 0016 B906                     MOV     R1,#6
00021 0018 1400     )   SPV        CALL    SHFT
00022 001A E918     )               DJNZ    R1,SPV
00023 001C 83                       RET
00024
```

Symbol Table

LITES Section Inpage (001D)

```
    SB ----- 0006          SPV ---- 0018
    SSS ---- 0002          SST ---- 0010
```

OUTCL Unbound Global

SHFT Unbound Global

MANUAL COMPAR ROUTINE

```
00003                         ASMID    AS8048
00004                         GLOBAL   LOAD,COMPR1,CLRKB
00005                         SECTION  COMPAR,INPAGE
00006                         NAME     COMPAR
00007 0000 A5       COMPR1    CLR      F1
00008 0001 D5                 SEL      RB1
00009 0002 1400   )           CALL     LOAD
00010 0004 1400   )           CALL     CLRKB
00011 0006 B805               MOV      R0,#5
00012 0008 FD                 MOV      A,R5
00013 0009 D0                 XRL      A,@R0
00014 000A 9617   )           JNZ      QT
00015 000C FE                 MOV      A,R6
00016 000D 18                 INC      R0
00017 000E D0                 XRL      A,@R0
00018 000F 9617   )           JNZ      QT
00019 0011 FF                 MOV      A,R7
00020 0012 18                 INC      R0
00021 0013 D0                 XRL      A,@R0
00022 0014 9617   )           JNZ      QT
00023 0016 B5                 CPL      F1
00024 0017 C5       QT        SEL      RB0
00025 0018 83                 RET
00026
```

Symbol Table

COMPAR Section Inpage (0019)

COMPR1 - 0000 G         QT ----- 0017

CLRKB Unbound Global

LOAD Unbound Global

FAC DOWN SHIFT AND COMPRESS

```
00003                         ASMID    AS8048
00004                         NAME     FCSHFT
00005                         SECTION  FCSHFT,INPAGE
00006                         GLOBAL   SHFT,CPRESS,CLRKB
00007 0000 37                 CPL      A
00008 0001 0312               ADD      A,#18
00009 0003 A9                 MOV      R1,A
00010 0004 C60A   )           JZ       CPRESS
00011 0006 1400   )  CUD      CALL     SHFT
00012 0008 E906   )           DJNZ     R1,CUD
00013 000A FD        CPRESS   MOV      A,R5
00014 000B 43F0               ORL      A,#0F0H
```

```
00015 000D 47              SWAP    A
00016 000E 5E              ANL     A,R6
00017 000F AE              MOV     R6,A
00018 0010 FF              MOV     A,R7
00019 0011 430F            ORL     A,#0FH
00020 0013 47              SWAP    A
00021 0014 5E              ANL     A,R6
00022 0015 AE              MOV     R6,A
00023 0016 FF              MOV     A,R7
00024 0017 43F0            ORL     A,#0F0H
00025 0019 47              SWAP    A
00026 001A 5D              ANL     A,R5
00027 001B AD              MOV     R5,A
00028 001C 47              SWAP    A
00029 001D AF              MOV     R7,A
00030 001E FD      CLRKB   MOV     A,R5
00031 001F 431F            ORL     A,#1FH
00032 0021 AD              MOV     R5,A
00033 0022 FF              MOV     A,R7
00034 0023 43FC            ORL     A,#0FCH
00035 0025 AF              MOV     R7,A
00036 0026 83              RET
00037
```

Symbol Table

FCSHFT Section Inpage (0027)

```
    CLRKB -- 001E G         CPRESS - 000A G         CUD ---- 0006
```

SHFT Unbound Global

```
00001                       ASMID   AS8048
00002                       NAME    FACRD
00003                       SECTION FCRD,INPAGE
00004                       GLOBAL  FACRD
00005       0000    )   AAA EQU     LO(FCC)
00006 0000 FEDDFEED      FCC BYTE   254,221,254,237,246,221,246,237
00006 0004 F6DDF6ED
00007 0008 EEDDFADD          BYTE   238,221,250,221,253,221,251,109
00007 000C FDDDFB6D
00008 0010 E7       FACRD    RL     A
00009 0011 0300    )         ADD    A,#AAA
00010 0013 AA              MOV     R2,A
00011 0014 A3              MOVP    A,@A
00012 0015 AD              MOV     R5,A
00013 0016 FA              MOV     A,R2
00014 0017 17              INC     A
00015 0018 A3              MOVP    A,@A
00016 0019 AF              MOV     R7,A
00017 001A BEFF            MOV     R6,#0FFH
00018 001C 83              RET
00019
```

Symbol Table

FCRD Section Inpage (001D)

```
    AAA ---- 0000 L         FACRD -- 0010 G         FCC ---- 0000
```

LITES AND MANUAL OFF

```
00003                        ASMID    AS8048
00004                        NAME     OFF
00005                        SECTION  OFF
00006                        GLOBAL   LTSOFF,MCLEAR
00007  0000  1400      )     CALL     LTSOFF
00008  0002  23FF     MCLEAR MOV      A,#0FFH
00009  0004  39              OUTL     P1,A
00010  0005  0C              MOVD     A,P4
00011  0006  0D              MOVD     A,P5
00012  0007  80              MOVX     A,@R0
00013  0008  83              RET
00014
```

Symbol Table

OFF Section (0009)

MCLEAR - 0002 G

LTSOFF Unbound Global

```
00001                        ASMID    AS8048
00004                        NAME     BASS
00005                        SECTION  BASS,INPAGE
00006                        GLOBAL   ACHORD,ARP,FUNCT,ARPEOP
00007                        GLOBAL   PEDGEN,WALK,PEDAL,TRIGS,OLDT,STRIG
00008  0000  D5              SEL      RB1
00009  0001  B973            MOV      R1,#115
00010  0003  B86D            MOV      R0,#109
00011  0005  FC              MOV      A,R4
00012  0006  AE              MOV      R6,A   ; PLACE R4 AS OLTIMING IN R6
00013  0007  2320            MOV      A,#20H
00014  0009  3A              OUTL     P2,A
00015  000A  0E              MOVD     A,P6
00016  000B  47              SWAP     A
00017  000C  A1              MOV      @R1,A
00018  000D  0F              MOVD     A,P7
00019  000E  41              ORL      A,@R1  ; COMPLETES NEW RHYTHM TIMING
00020  000F  A1              MOV      @R1,A  ; PLACE NEW TIMING IN R4
00021  0010  27              CLR      A
00022  0011  3A              OUTL     P2,A
00023  0012  F1              MOV      A,@R1
00024  0013  531F            ANL      A,#1FH
00025  0015  AC              MOV      R4,A
00026  0016  DE              XRL      A,R6
00027  0017  C648      )     JZ       CONT
00028  0019  F0              MOV      A,@R0
00029  001A  4301            ORL      A,#01H ;SET BASS FLAG
00030  001C  A0              MOV      @R0,A
00031  001D  FC              MOV      A,R4
00032  001E  7228      )     JB3      CONT2
00033  0020  DE              XRL      A,R6
00034  0021  37              CPL      A
00035  0022  7228      )     JB3      CONT2 ; NO 1-0 CHANGE
```

```
00036 0024 F0                MOV    A,@R0
00037 0025 431C              ORL    A,#1CH ; SET ALL FLAGS
00038 0027 A0                MOV    @R0,A
00039 0028 2350       CONT2  MOV    A,#50H ; GET RHYTHM PATTERN
00040 002A 3A                OUTL   P2,A
00041 002B 0F                MOVD   A,P7
00042 002C AB                MOV    R3,A ; PUT PATTERN IN R3
00043 002D 27                CLR    A
00044 002E 3A                OUTL   P2,A
00045 002F FB                MOV    A,R3
00046 0030 D307              XRL    A,#07H ; CHECK FOR 3/4 TIME
00047 0032 C63C     )        JZ     THREE4
00048 0034 FC                MOV    A,R4
00049 0035 DE                XRL    A,R6
00050 0036 530C              ANL    A,#0CH
00051 0038 40                ORL    A,@R0
00052 0039 A0                MOV    @R0,A ; BIT 2 CONTAINS CHORD CHANGE.
                                           BIT 3 ARP RESET
00053 003A 0448     )        JMP    CONT
00054 003C FC        THREE4  MOV    A,R4
00055 003D 6E                ADD    A,R6
```

EOP CONTROL SECTION

```
00056 003E 530F              ANL    A,#0FH
00057 0040 D30B              XRL    A,#1L
00058 0042 9648     )        JNZ    CONT
00059 0044 230C     SFLAG    MOV    A,#0CH
00060 0046 40                ORL    A,@R0
00061 0047 A0                MOV    @R0,A
00062 0048 0400     ) CONT   JMP    ACHORD   ; AUTOMATIC CHORD CHANGE
                                             ROUTINE/
00063 004A 1400     ) OLDT   CALL   ARP
00064                        ;---------CHECK FOR PEDAL DOWN-----
00065 004C 2310       OLDT1  MOV    A,#10H
00066 004E 3A                OUTL   P2,A
00067 004F 0E                MOVD   A,P6      ; CHECK FOR BREAK TO KILL
                                                PEDALS
00068 0050 37                CPL    A
00069 0051 726B     )        JB3    STRIG
00070 0053 0F                MOVD   A,P7 ; GET PEDAL REGISTER
00071 0054 C65A     )        JZ     NXT1
00072 0056 C5                SEL    RB0
00073 0057 1400     )        CALL   PEDAL
00074 0059 83                RET
00075                        ;-------CHECK FOR AUTOCHORD ON--------
00076 005A 1400     ) NXT1   CALL   ARPEOP
00077 005C 1261     )        JB0    NXT2
00078 005E 1400     )        CALL   WALK
00079 0060 83                RET
00080                        ;--------------CHECK FOR PROGRAM AND THREE FINGER
00081 0061 C5        NXT2    SEL    RB0
00082 0062 1400     )        CALL   FUNCT
00083 0064 37                CPL    A
00084 0065 9272     )        JB4    CPDGEN ; IF AUTOPERFORM
00085 0067 526B     )        JB2    STRIG  ; NOT IF 3F
00086 0069 3272     )        JB1    CPDGEN ; CHECK FOR 1F
```

```
00087                    ;----------SHUT OFF PEDAL TRIGS-------
00088 006B 27    STRIG    CLR    A
00089 006C B97D           MOV    R1,#7DH
00090 006E A1             MOV    @R1,A
00091 006F 1400  >        CALL   TRIGS
00092 0071 83             RET
00093                    ;----------PLAY BASS----------
00094 0072 1400  > CPDGEN CALL   PEDGEN
00095 0074 83             RET
00096
```

Symbol Table

BASS Section Inpage (0075)

```
    CONT --- 0048          CONT2 -- 0028
    OLDT ---- 004A G       OLDT1 -- 004C
    CPDGEN - 0072          NXT1 --- 005A
    SFLAG -- 0044          STRIG -- 006B G
```

ACHORD Unbound Global

ARP Unbound Global

ARPEOP Unbound Global

FUNCT Unbound Global

PEDAL Unbound Global

PEDGEN Unbound Global

TRIGS Unbound Global

WALK Unbound Global

```
00001                    ASMID   AS8048
00004                    NAME    PEDAL
00005                    SECTION PEDAL,INPAGE
00006                    GLOBAL  PSEND
00007 0000 B97C          MOV     R1,#124
00008 0002 07             DEC     A
00009 0003 A1             MOV     @R1,A
00010 0004 19             INC     R1
00011 0005 2302           MOV     A,#02H
00012 0007 41             ORL     A,@R1
00013 0008 A1             MOV     @R1,A
00014 0009 2310           MOV     A,#10H
00015 000B 3A             OUTL    P2,A
00016 000C 0F             MOVD    A,P7
00017 000D C611  >        JZ      NOPED
00018 000F 1400  >        CALL    PSEND
00019 0011 83    NOPED    RET
00020
```

Symbol Table

PEDAL Section Inpage (0012)

NOPED -- 0011

BSEND Unbound Global

```
00001                           ASMID    AS8048
00004                           NAME     PEDGEN
00005                           SECTION  PEDGEN,INPAGE
00006                           GLOBAL   BSEND,TRIGS,KDOWN,STRIG
00007 0000 B97C                 MOV      R1,#124
00008 0002 F1                   MOV      A,@R1
00009 0003 F20B     )           JB7      QUEST    ; CHECK IF PREVIOUSLY PLAYED
00010 0005 19                   INC      R1
00011 0006 2302                 MOV      A,#02
00012 0008 A1                   MOV      @R1,A
00013 0009 1400     )           CALL     BSEND
00014 000B 2611     )   QUEST   JNT0     FIN
00015                           ;------CHECK FOR KEYDOWN----
00016 000D 4611     )           JNT1     FIN
00017                           ;-----TURN OFF NOTE------------
00018 000F 0400     )           JMP      STRIG
00019 0011 83           FIN     RET
00020
```

Symbol Table

PEDGEN Section Inpage (0012)

FIN ---- 0011          QUEST -- 000B

BSEND Unbound Global

KDOWN Unbound Global

STRIG Unbound Global

TRIGS Unbound Global

UTILITY SUBROUTINE FILE 2

```
00003                           ASMID    AS8048
00004                           NAME     UTIL2
00005                           SECTION  UTIL2,INPAGE
00006                           GLOBAL   DELAY,BFOOT,BFOOT1,OUTCL
00007                           GLOBAL   NONOTE
00008                           ;----------DELAY ROUTINE---------------
00009 0000 27           DELAY   CLR      A
00010 0001 62                   MOV      T,A
00011 0002 55                   STRT     T
```

```
00012 0003 1607    )    SAD    JTF     ED
00013 0005 0403    )           JMP     SAD
00014 0007 65            ED    STOP    TCNT
00015 0008 83                  RET
00016                          ;---------BRITEFOOT OUTPUT ROUTINE-----
00017 0009 F0            BFOOT MOV     A,@R0
00018 000A 47                  SWAP    A
00019 000B 0305                ADD     A,#5
00020 000D AB            BFOOT1 MOV    R3,A
00021 000E 97                  CLR     C
00022 000F 537F                ANL     A,#7FH ;STRIP SUBTRACTOR
00023 0011 03F4                ADD     A,#0F4H
00024 0013 F616   )            JC      CONT
00025 0015 FB                  MOV     A,R3
00026 0016 3F             CONT MOVD    P7,A
00027 0017 2360                MOV     A,#60H
00028 0019 0400   )            JMP     OUTCL
00029                          ;-------NONOTE CHECK IN ARP DATA-----
00030 001B B96E          NONOTE MOV   R1,#110
00031 001D F1                  MOV     A,@R1
00032 001E 37                  CPL     A
00033 001F 9624   )            JNZ     FIN2
00034 0021 19                  INC     R1
00035 0022 F1                  MOV     A,@R1
00036 0023 37                  CPL     A
00037 0024 83            FIN2  RET
00038
```

Symbol Table

UTIL2 Section Inpage (0025)

```
    BFOOT -- 0009 G         BFOOT1 - 000D G
    FIN2  --- 0024          NONOTE - 001B G
    CONT  --- 0016          DELAY  -- 0000 U
    SAD   ---- 0003
```

OUTCL Unbound Global

```
00001                          ASMID   AS8048
00002                          NAME    ACHORD
00005                          SECTION ACHORD,INPAGE
00006                          GLOBAL  SUB1,SUB2,SUB3,SUB4,COUT,MCLEAR
00007                          GLOBAL  BFOOT,FUNCT,OLDT,STRIG,ARPEOP
00008                          GLOBAL  FINARP
00009 0000 B972                MOV     R1,#114 ; TIMING REGISTER
00010 0002 1400    )           CALL    ARPEOP
00011 0004 A1                  MOV     @R1,A
00012 0005 B86D                MOV     R0,#109
00013 0007 1400    )           CALL    FUNCT
00014 0009 9247    )           JB4     FIN2 ; NO AUTO PERFORM
00015 000B B247    )           JB5     FIN2 ; NO PROGRAM
00016 000D F1                  MOV     A,@R1
00017 000E B975                MOV     R1,#117
00018 0010 B23E    )           JB5     FIN3 ; NO SILENT SOUND SWITCH
```

```
00019 0012 F1              MOV    A,@R1  ;CHECK FOR BEGINNING
00020 0013 0301             ADD    A,#01H ; SET CARRY FOR LATER
                                          JUMP TO CHANG1
00021 0015 B100             MOV    @R1,#0
00022 0017 F0               MOV    A,@R0
00023 0018 37               CPL    A
00024 0019 523C      )      JB2    FIN1
00025 001B F0               MOV    A,@R0
00026 001C 531B             ANL    A,#1BH
00027 001E A0               MOV    @R0,A
00028 001F E624      )      JNC    CHANGE
00029                       ;-----------CHORD CHANGE ROUTINE-----------
00030 0021 C5        CHANG1 SEL    RB0
00031 0022 B81F             MOV    R0,#1FH
00032 0024 C5        CHANGE SEL    RB0
00033 0025 18               INC    R0
00034 0026 FC               MOV    A,R4
00035 0027 D8               XRL    A,R0   ;CHECK FOR END OF RANGE
00036 0028 962C      )      JNZ    NEXT
00037 002A B820             MOV    R0,#20H
00038 002C C8        NEXT   DEC    R0
00039 002D 1400      )      CALL   SUB2
00040 002F B972             MOV    R1,#114
00041 0031 F1               MOV    A,@R1
00042 0032 37               CPL    A
00043 0033 1237      )      JB0    NBFOOT ; NO BRITE FOOT BECAUSE
                                          OF WALKING BASS
00044 0035 1400      )      CALL   BFOOT
00045 0037 1400      ) NBFOOT CALL SUB3
00046 0039 1400      )      CALL   COUT
00047 003B D5               SEL    RB1
00048 003C 0400      ) FIN1 JMP    OLDT
00049 003E 1400      ) FIN3 CALL   MCLEAR
00050 0040 B1FF             MOV    @R1,#0FFH
00051 0042 1400      )      CALL   FINARP
00052 0044 C5               SEL    RB0
00053 0045 0400      )      JMP    STRIG
00054 0047 B1FF      ) FIN2 MOV    @R1,#0FFH
00055 0049 0400      )      JMP    OLDT
```

Symbol Table

ACHORD Section Inpage (004B)

```
   CHANG1 - 0021         CHANGE - 0024
   NBFOOT - 0037         NEXT  --- 002C
   FIN1   --- 003C       FIN2  --- 0047
```

ARPEOP Unbound Global

BFOOT Unbound Global

COUT Unbound Global

FINARP Unbound Global

FUNCT Unbound Global

MCLEAR Unbound Global

OLDT Unbound Global

STRIG Unbound Global

SUB1 Unbound Global

SUB2 Unbound Global

SUB3 Unbound Global

SUB4 Unbound Global

```
                                          STORE ADRESS OF BASS NOTE
00003                        ASMID    AS8048
00004                        NAME     STA
00005                        SECTION  STA
00006                        GLOBAL   OUTCL
00007 0000 3F                MOVD     P7,A
00008 0001 2390              MOV      A,#90H
00009 0003 3E                MOVD     P6,A
00010 0004 0405              JMP      OUTCL
00013                        ASMID    AS8048
00014                        NAME     STD
00015                        SECTION  STD
00016                        GLOBAL   OUTCL
00017 0000 3F                MOVD     P7,A
00018 0001 47                SWAP     A
00019 0002 3E                MOVD     P6,A
00020 0003 23A0              MOV      A,#0A0H
00021 0005 3A        OUTCL   OUTL     P2,A
00022 0006 27                CLR      A
00023 0007 3A                OUTL     P2,A
00024 0008 00                NOP
00025 0009 0E                MOVD     A,P6
00026 000A 0F                MOVD     A,P7
00027 000B 83                RET
00030                        NAME     LTSOFF
00031                        SECTION  LTSOFF
00032                        ASMID    AS8048
00033                        GLOBAL   OUTCL 00034 0000 230F              MOV      A,#15
00035 0002 3F                MOVD     P7,A
00036 0003 2340              MOV      A,#40H
00037 0005 0405              JMP      OUTCL
00038
```

Symbol Table

LTSOFF Section (0007)

STA Section (0006)

STD Section (000C)

OUTCL -- 0005 G

GLOBAL SYMBOL LIST

| | | | | | | | |
|---|---|---|---|---|---|---|---|
| ACHORD | 0065 | ALOAD | 073E | ARP | 0100 | ARPEOP | 0758 |
| AXMIT | 00B0 | BASS | 0180 | BFOOT | 05B7 | BFOOT1 | 05BB |
| BSEND | 0200 | CCD | 001D | CHECK | 0236 | CLOAD | 0748 |
| CLRKB | 049A | COMPAR | 06D4 | COMPR1 | 06D4 | CONTROL | 0000 |
| COUT | 0734 | CPRESS | 0486 | CSD | 07FB | DEFLT | 028B |
| DELAY | 05AE | DIMAG1 | 0797 | DIRECT | 0400 | EDS | 0033 |
| FAC | 02B8 | FACRD | 00ED | FCRD | 00DD | FCSHFT | 047C |
| FINARP | 0138 | FUNCT | 0754 | JAZZ | 0500 | KDOWN | 00FA |
| LITES | 02E0 | LOAD | 0720 | LTSOFF | 01F5 | MCLEAR | 03D4 |
| MEMORY | 0027 | NOBASS | 07AC | NONOTE | 05CC | OFF | 03D2 |
| OLDT | 01CA | OUTCL | 05E1 | PATTERN | 0000 | PEDAL | 06ED |
| PEDGEN | 03C0 | PERFRM | 0600 | PRFM2 | 060B | PROGRAM | 04A3 |
| QUIZ | 056A | QWE | 07A1 | SCDEF | 07E8 | SHFT | 070E |
| SHIFT | 0700 | SINGLE | 0148 | STA | 05D6 | STD | 05DC |
| STRIG | 01EB | SUB1 | 067B | SUB2 | 0692 | SUB3 | 06A2 |
| SUB4 | 0648 | SUB5 | 0660 | SUB6 | 06BB | SYST | 0005 |
| TRIGS | 0229 | UPLOAD | 042C | UTIL2 | 05AE | UTILITY | 0700 |
| WALK | 0767 | | | | | | |

MEMORY MAP

| | | | |
|---|---|---|---|
| 0000-0064 | CONTROL | SECTION | ABSOLUTE 1ST BANK |
| 0065-00AF | ACHORD | SECTION | INPAGE 1ST BANK |
| 00B0-00DC | AXMIT | SECTION | INPAGE 1ST BANK |
| 00DD-00F9 | FCRD | SECTION | INPAGE 1ST BANK |
| 00FA-00FE | KDOWN | SECTION | BYTE 1ST BANK |
| 0100-017F | ARP | SECTION | INPAGE 1ST BANK |
| 0180-01F4 | BASS | SECTION | INPAGE 1ST BANK |
| 01F5-01FB | LTSOFF | SECTION | BYTE 1ST BANK |
| 0200-0235 | BSEND | SECTION | INPAGE 1ST BANK |
| 0236-028A | CHECK | SECTION | INPAGE 1ST BANK |
| 028B-02B7 | DEFLT | SECTION | INPAGE 1ST BANK |
| 02B8-02DF | FAC | SECTION | INPAGE 1ST BANK |
| 02E0-02FC | LITES | SECTION | INPAGE 1ST BANK |
| 0300-03BF | PATTERN | SECTION | ABSOLUTE 1ST BANK |
| 03C0-03D1 | PEDGEN | SECTION | INPAGE 1ST BANK |
| 03D2-03DA | OFF | SECTION | BYTE 1ST BANK |
| 03E0-03FF | PATTERN | SECTION | ABSOLUTE 1ST BANK |
| 0400-047B | DIRECT | SECTION | INPAGE 1ST BANK |
| 047C-04A2 | FCSHFT | SECTION | INPAGE 1ST BANK |
| 04A3-04FB | PROGRAM | SECTION | INPAGE 1ST BANK |
| 0500-0569 | JAZZ | SECTION | INPAGE 1ST BANK |
| 056A-05AD | QUIZ | SECTION | INPAGE 1ST BANK |
| 05AE-05D5 | UTIL2 | SECTION | INPAGE 1ST BANK |
| 05D6-05DB | STA | SECTION | BYTE 1ST BANK |
| 05DC-05E7 | STD | SECTION | BYTE 1ST BANK |
| 0600-06D3 | PERFRM | SECTION | INPAGE 1ST BANK |
| 06D4-06EC | COMPAR | SECTION | INPAGE 1ST BANK |
| 06ED-06FE | PEDAL | SECTION | INPAGE 1ST BANK |
| 0700-0766 | UTILITY | SECTION | INPAGE 1ST BANK |
| 0767-07FF | WALK | SECTION | INPAGE 1ST BANK |

The chord teaching system of the present invention operates in seven different modes to assist the organist in learning and playing various chords. The learning organist can select the mode of operation and thereby has the freedom to practice or advance at his/her own rate. Each mode of operation has unique features different from the other modes to assist the learning organist in separate ways. In the one finger chord mode the learning organist can select different chord types with the same alphabetic note or the same chord type with different alphabetic notes. By selecting a chord type switch and then depressing a key within a thirteen note range associated with the system the learning organist can hear the sound of the selected chord and can see the root note of the chord being played. The learning organist can thus hear the sounds of a chord before he/she developes the ability or knowledge to depress the proper key pattern to normally produce the selected chord. Thus, at an early stage in the learning process the organist can become familiar with the sounds of the various chords.

In the three finger chord mode the learning organist can select different chord types with the same alphabetic key or the same chord type with different alphabetic keys. By selecting a chord type switch and depressing a key within a thirteen note range associated with the system the learning organist is shown the correct key pattern to form the selected chord. The organist can thus learn or refresh his/her knowledge of the correct finger position to play the selected chord. Thus the learning organist can select the chords to be learned and then progress at his/her own rate in mastering the correct finger position for the selected chords.

In the chord quiz mode the learning organist can test his/her mastering of the correct finger position for a selected chord. By selecting a chord type switch and depressing a key within the thirteen note range associated with the system the learning organist selects the test chord. The learning organist must now depress the keys forming the correct finger pattern for the test chord. If the learning organist depresses the keys forming the correct finger pattern for the test chord he/she is given a visual reinforcement that the depressed keys form the correct finger pattern. If the learning organist depresses keys that do not form the correct finger pattern for the test chord he/she is shown which keys do form the correct finger pattern for the test chord and then given another opportunity to depress the correct keys. In the above manner the learning organist is given positive reinforcement for a correct response and if his/her response is incorrect is shown the correct response and then given the opportunity to make the correct response. The learning organist is given complete control over the selection of the test chord which can be selected even if the learning organist is unsure of the correct finger pattern necessary for forming the test chord. This mode of operation closely simulates the learning environment provided by an organ teacher while yet giving the learning organist the flexibility to select the test chords and to progress at his/her own rate and removes the pressure of having an instructor or classmates witnessing the testing or quizing procedure.

In the program mode the learning organist can select different chord types with the same alphabetic key or the same chord type with different alphabetic keys. By selecting a chord type switch and depressing a key within the thirteen note range associated with the system the learning organist can store the selected chord into memory for subsequent use in the program plus one finger chord mode, the program plus three finger chord mode or the program plus autoperform mode. The learning organist can store up to seventy-six chords in sequence. As each chord is being stored the chord is sounded and the complete finger pattern for the selected chord is illustrated to the learning organist. In addition, the learning organist can sequentially erase chords stored into memory and the complete finger pattern for the last stored chord is illustrated for the learning organist.

In the program plus one finger chord mode the learning organist must correctly depress the key within the thirteen note range associated with the system which corresponds to the root note of the chord previously stored into memory. In this mode the learning organist is shown the key corresponding to the root note of the stored chord. If the learning organist depresses the incorrect key the system does not proceed and the learning organist is provided with another opportunity to depress the correct key. If the learning organist depresses the correct key the stored chord is sounded and the system increments to illustrate to the learning organist the root note corresponding to the next stored chord. By operating in this manner, if all the chords of a particular song are stored in sequence the learning organist can attempt to play the song and is only required to depress the proper root note for each stored chord to sound the entire chord. This operation facilitates the learning of songs and enables the organist to hear the chords sounded in proper sequence with the minimum of effort by the organist.

In the program plus three finger mode the learning organist must depress the keys within the thirteen note range in the correct pattern of the chord previously stored into memory. In this mode the learning organist is shown the correct keys or finger pattern to depress corresponding to the stored chord. If the learning organist depresses the incorrect key pattern the system does not proceed and the learning organist is provided with another opportunity to depress the correct key pattern. If the learning organist depresses the correct key pattern the system increments to illustrate to the learning organist the key pattern corresponding to the next stored chord. By operating in this manner, if all the chords of a particular song are stored in sequence the learning organist can attempt to play the song and is assisted by having the key pattern for each chord illustrated to him/her. This operation facilitates the learning of songs even though the organist has not completely mastered the key pattern for each chord in the song.

In the program plus autoperform mode the learning organist can listen to a sequence of chords previously stored into memory being played at the appropriate time within a song under control of the rhythm unit of the organ and see the key pattern for each chord as it is played. In this mode the chords previously stored into memory are automatically played in sequence solely under the control of the rhythm unit of the organ. As each chord is played the key pattern for that chord is illustrated to the learning organist. By operating in this manner the learning organist can hear the chords of a song being played at the appropriate time and see the key pattern for the chord as it is played which is quite similar to watching and listening to an instructor play a particular song.

What is claimed is:

1. A chord teaching system for use in an electronic musical instrument having a keyboard providing a keyboard output signal on at least one of a plurality of keyboard output lines and a tone generator receiving said keyboard output signal on at least one of said plurality of keyboard output lines and producing a musical output and for enabling a instrument player to choose a chord to be learned, indicating the key corresponding to at least the root note of the chosen chord and sounding the chosen chord, said chord teaching system being capable of operating in at least two different teaching modes and comprising:

a microprocessor unit programmed for operating in at least two different modes corresponding to the two different teaching modes of said system and having a plurality of input lines, a plurality of output lines and a memory containing information signals representing musical chord type patterns normalized to an alphabetic note;

mode means actuatable by an instrument player to select the mode of operation of said microprocessor and having a mode output signal line connected to at least one of said plurality of input lines of said microprocessor, said mode means producing a mode output signal on said mode output line to control the mode of operation of said microprocessor;

chord type means actuatable by an instrument player to select the type of said chord chosen and having a chord type output line connected to at least one of said plurality of input lines of said microprocessor, said chord type means producing a chord type signal on said chord type output line;

select key means actuatable by an instrument player and forming a portion of said keyboard and having key output lines connected to at least one of said plurality of input lines of said microprocessor, said select key means producing a key output signal representing the alphabetic note of said chosen chord;

said microprocessor unit responsive to said chord type signal for selecting information signals representing one of said normalized chord type patterns stored in said memory and responsive to said key output signal for shifting said information signals representing said normalized chord type patterns into the key of said chosen chord and placing said shifted normalized chord type pattern information signals on at least one of said output lines of said microprocessor; and, a visual display means having a plurality of input lines connected to at least one of said plurality of output lines of said microprocessor and responsive to said shifted normalized chord type pattern information signals for indicating to the instrument player at least one of said select keys corresponding to the root note of said chosen chord.

2. A chord teaching system as set forth in claim 1 wherein said tone generator receives at least one of said plurality of output lines of said microprocessor and is responsive to said shifted normalized chord type information signals for producing the musical output corresponding to the chosen chord.

3. A chord teaching system as set forth in claim 1 wherein said visual display means indicates to the instrument player each of said select keys corresponding to the notes of said chosen chord.

4. A chord teaching system as set forth in claims 2 or 3 wherein said electronic musical instrument comprises a plurality of pedals and a pedal teaching device having a plurality of input lines connected to at least one of said plurality of output lines of said microprocessor; and, said microprocessor producing pedal output signals at said output lines connected to said pedal teaching device for indicating to the instrument player the pedal corresponding to the root note of the chosen chord.

5. A chord teaching system as set forth in claim 2 wherein said chord type means comprises a plurality of switches each corresponding to a different chord type and each providing one of said chord type output signals when depressed by an instrument player, a latch circuit for receiving said chord type output signals and retaining said chord type output signals whereby the chord type for the chosen chord remains the same until a different one of said chord type switches is depressed by the instrument player even though the key may be changed by depressing one of said select keys.

6. A chord teaching system as set forth in claim 3 wherein said chord type means receives said mode output signal from said mode means for nullifying said chord type output signals until another chord type switch is depressed.

7. A chord teaching system as set forth in claim 1 wherein said visual display means comprises a plurality of illuminating means positioned above said select keys.

8. A chord teaching system as set forth in claim 7 wherein said select keys correspond to the keys of F in the second octave through F in the third octave.

9. A chord teaching system for use in an electronic musical instrument having a keyboard formed by a plurality of keys with each key having a key output line and for enabling a instrument player to choose a chord to be learned and to test his/her knowledge of the notes forming the chosen chord, said chord teaching system comprising:

a microprocessor unit having a plurality of input lines and a plurality of output lines;

a chord selector means actuatable by an instrument player and having a plurality of chord output lines connected to at least one of said plurality of input lines of said microprocessor, said chord selector means producing chord identification signals on said chord output lines for providing said microprocessor with information representing the chosen chord;

select key means actuatable by an instrument player and forming a portion of said keyboard and having a plurality of key output lines connected to at least one of said input lines of said microprocessor, said select key means producing key output signals on said key output lines representing keys depressed by an instrument player;

said micrprocessor unit responsive to said chord identification signals and said key output signals for comparing said signals and producing a match output signal when said signals are the same and a mistake output signal when said signals are different;

a visual display means having a plurality of input lines connected to at least one of said plurality of output lines of said microprocessor and responsive to said match output signal from said microprocessor for indicating that said chord identification signals are the same as said key output signals and responsive to said mistake output signal from said microprocessor for indicating that said chord identification signals are not the same as said key output signals.

10. A chord teaching system as set forth in claim 9 wherein said visual display means responsive to said mistake output signal from said microprocessor indicates to the instrument player said select keys corresponding to the notes of the chosen chord.

11. A chord teaching system as set forth in claims 9 or 10 wherein said chord selector comprises:

a chord type means actuatable by an instrument player to select the type of said chosen chord and having a chord type output line connected to at least one of said plurality of input lines of said microprocessor, said chord type means producing a chord type signal on said chord type output lines; and, alphabetic key means actuatable by an instrument player and forming a portion of said keyboard and having key output lines connected to at least one of said plurality of input lines of said microprocessor, said alphabetic key means producing a key output signal representing the alphabetic note of said chosen chord.

12. A chord teaching system as set forth in claim 11 wherein said microprocessor comprises a memory containing information signals representing musical chord type patterns normalized to an alphabetic note and said microprocessor unit responsive to said chord type signal for selecting information signals corresponding to one of said normalized chord type patterns stored in said memory and responsive to said key output signal for shifting said information signals representing the selected normalized chord type pattern into the alphabetic key of said chosen chord and comparing said shifted normalized chord type pattern signals to said key output signals representing depressed keys by the instrument player.

13. A chord teaching system for use in an electronic musical instrument having a keyboard formed by a plurality of keys with each key having a key output line and for enabling a instrument player to choose a chord to be learned and to test his/her knowledge of the notes forming the chosen chord, said chord teaching system comprising:
   a microprocessor unit having a plurality of input lines, a plurality of output lines, and a memory containing information signals representing musical chord type patterns normalized to an alphabetic note;
   a chord type means actuatable by an instrument player to select the type of said chosen chord and having a chord type output line connected to at least one of said plurality of input lines of said microprocessor, said chord type means producing a chord type signal on said chord type output line; and
   select key means actuatable by an instrument player and forming a portion of said keyboard and having key output lines connected to at least one of said plurality of input lines of said microprocessor, said select keys means producing a key output signal representing the alphabetic note of said chosen chord;
   said select key means also producing key output signals representing keys depressed by the instrument player in attempting to play the notes forming the chosen chord;
   said microprocessor unit responsive to said chord type signal for selecting information signals corresponding to one of said normalized chord type patterns stored in said memory and responsive to said key output signal representing the alphabetic note of said chosen chord for shifting said information signals representing the selected normalized chord type pattern into the alphabetic key of said chosen chord and comparing said shifted normalized chord type pattern signals to said key output signals representing depressed keys by the instrument player in attempting to play the notes forming the chosen chord and producing a match output signal when said compared signals are the same and a mistake output signal when said compared signals are different; and,
   a visual display means having a plurality of output lines connected to at least one of said plurality of output lines of said microprocessor and responsive to said match output signal from said microprocessor for indicating that said compared signals are the same and responsive to said mistake output signal for indicating that said compared signals are different.

14. A chord teaching system as set forth in claim 13 wherein said visual display means responsive to said mistake output signal from said microprocessor indicates to the instrument player said select keys corresponding to the notes of the chosen chord.

15. A chord teaching system for use in an electronic musical instrument having a keyboard formed by a plurality of keys with each key having a key output line and a tone generator producing a musical output having a plurality of input lines connected to at least one of said key output lines and for enabling the instrument player to choose a chord to be learned, indicating the key corresponding to the root note of the chosen chord and sounding the chosen chord, said chord teaching system comprising:
   a microprocessor unit having a plurality of input lines, a plurality of output lines and a memory containing information signals representing musical chord type patterns normalized to an alphabetic note;
   chord type means actuatable by an instrument player to select the type of said chosen chord and having a chord type output line connected to at least one of said plurality of input lines of said microprocessor, said chord type means producing a chord type signal on said chord type output line;
   select key means actuatable by an instrument player and forming a portion of said keyboard and having key output lines connected to at least one of said plurality of input lines of said microprocessor, said select key means producing a key output signal representing the alphabetic note of said chosen chord;
   said microprocessor unit responsive to said chord type signal for selecting information signals corresponding to one of said normalized chord type patterns stored in said memory and responsive to said key output signal for shifting said information signals representing the selected normalized chord type pattern into the alphabetic key of said chosen chord and providing said shifted normalized chord type pattern signals on at least one of said output lines of said microprocessor; and,
   a visual display means having a plurality of input lines connected to at least one of said plurality of output lines of said microprocessor and responsive to said shifted normalized chord type pattern information signals for indicating to the instrument player said select key corresponding to the root note of said chosen chord.

16. A chord teaching system as set forth in claim 15 wherein at least some of said input lines of said tone generator are connected to at least some of said output lines of said microprocessor unit for receiving said shifted normalized chord type pattern information signals and for sounding said chosen chord.

17. A chord teaching system as set forth in claims 15 or 16 wherein said electronic musical instrument comprises a plurality of pedals and a pedal teaching device having a plurality of input lines connected to at least one of said plurality of output lines of said microprocessor; and, said microprocessor producing pedal output signals at said output lines connected to said pedal teaching device for indicating to the instrument player the pedal corresponding to the root note of the chosen chord.

18. A chord teaching system as set forth in claim 17 wherein said chord type means comprises a plurality of switches each corresponding to a different chord type and each providing one of said chord type output signals when depressed by an instrument player, a latch circuit for receiving said chord type output signals and retaining said chord type output signals whereby the chord type for the chosen chord remains the same until a different one of said chord type switches is depressed by the instrument player to change the chord type even though the key may be changed by depressing one of said select keys.

19. A chord teaching system for use in an electronic musical instrument having a keyboard formed by a plurality of keys with each key having a key output line and for enabling the instrument player to choose a chord to be learned and indicating the keys corresponding to the notes forming the chosen chord, said chord teaching system comprising:
- a microprocessor unit having a plurality of input lines, a plurality of output lines and a memory containing information signals representing musical chord type patterns normalized to an alphabetic note;
- chord type means actuatable by an instrument player to select the type of said chosen chord and having a chord type output line connected to at least one of said plurality of input lines of said microprocessor, said chord type means producing a chord type signal on said chord type output line;
- select key means actuatable by an instrument player and forming a portion of said keyboard and having key output lines connected to at least one of said plurality of input lines of said microprocessor, said select key means producing a key output signal representing the alphabetic note of said chosen chord;
- said microprocessor unit responsive to said chord type signal for selecting information signals corresponding to one of said normalized chord type patterns stored in said memory and responsive to said key output signal for shifting said information signals representing the selected normalized chord type pattern into the alphabetic key of said chosen chord and providing said shifted normalized chord type pattern signals on at least one of said output lines of said microprocessor; and,
- a visual display means having a plurality of input lines connected to at least one of said plurality of output lines of said microprocessor and responsive to said shifted normalized chord type pattern information signals for indicating to the instrument player said select keys corresponding to the notes of said chosen chord.

20. A chord teaching system as set forth in claim 19 wherein said electronic musical instrument comprises a plurality of pedals and a pedal teaching device having a plurality of input lines connected to at least one of said plurality of output lines of said microprocessor; and, said microprocessor producing pedal output signals at said output lines connected to said pedal teaching device for indicating to the instrument player the pedal corresponding to the root note of the chosen chord.

21. A chord teaching system as set forth in claim 20 wherein said chord type means comprises a plurality of switches each corresponding to a different chord type and each providing one of said chord type output signals when depressed by an instrument player, whereby the instrument player must choose a new chord type by depressing one of said chord type switches before the chord teaching system operates.

22. A chord teaching system for use in an electrical musical instrument having a keyboard formed by a plurality of keys with each key providing, upon actuation, an output key signal on an output key line and a tone generator receiving said output key signal on at least one of said output key lines and producing a musical output and for enabling an instrument player to choose a chord to be learned and for storing a sequence of chosen words for later use, said chord teaching system comprising:
- a microprocessor unit having a plurality of input lines, a plurality of output lines, a memory containing information signals representing musical chord type patterns normalized to an alphabetic note and storage means having a plurality of locations for retaining chosen chords for later use;
- chord type means actuatable by an instrument player to select the type of chord chosen and having chord type output lines connected to at least one of said plurality of input lines of said microprocessor, said chord type means producing a chord type signal on said chord type output lines;
- select key means actuatable by an instrument player and forming a portion of said keyboard and having key output lines connected to at least one of said plurality of input lines of said microprocessor, said select key means producing a key output signal representing the alphabetic note of the chosen chord;
- said microprocessor unit responsive to said chord type signal for selecting information signals corresponding to one of said normalized chord type patterns stored in said memory and responsive to said key output signals for shifting said information signals representing the selected normalized chord type pattern into the alphabetic key of said chosen chord and providing said shifted normalized chord type pattern signals on at least one of said output lines and retaining said chord type signal and said key output signal in one of said plurality of locations in said storage means; and,
- a visual display means having a plurality of input lines connected to at least one of said plurality of output lines of said microprocessor and responsive to said shifted normalized chord type pattern information signals for indicating to the instrument player said select keys corresponding to the notes of said chosen chord.

23. A chord teaching system as set forth in claim 22 further comprising means to increment said storage means to the next one of said plurality of locations for retaining the next chord type signal and key output signal representing the next chosen chord.

24. A chord teaching system as set forth in claim 23 further comprising erase means actuatable by the instrument player and having an erase output line connected to at least one of said input lines of said microprocessor, said erase means providing an erase output signal on said erase output line.

25. A chord teaching system as set forth in claim 24 wherein said microprocessor unit responsive to said erase output signal deletes the last stored chord from the last filled one of said plurality of locations in said storage means and provides an output signal representing the now last stored chord in said storage means, said visual display responsive to said output signal for indicating to the instrument player the notes corresponding to the now last stored chord.

26. A chord teaching system for use in an electronic musical instrument having a keyboard formed by a plurality of keys with each key having a key output line and a tone generator having a plurality of input lines connected to at least one of said key output lines and producing a musical output and for storing a sequence of preselected chords, sequentially indicating to the instrument player at least the key corresponding to the root note of each stored chord and requiring the instrument player to depress the indicated key in order to move to the next stored chord in the sequence, said chord teaching system comprising:
  a microprocessor unit having a plurality of input lines, a plurality of output lines and a storage means containing information signals corresponding to stored chords;
  select keys actuatable by an instrument player and forming part of said keyboard and having a plurality of key output lines connected to at least one of said input lines of said microprocessor, said select keys producing key output signals representing keys depressed by an instrument player on said key output lines to said microprocessor;
  visual display means having a plurality of input lines connected to at least one of said plurality of output lines of said microprocessor for indicating to the instrument player one of said select key corresponding to the root note of said stored chord;
  said microprocessor unit responsive to said key output signal for comparing said signal with the root note of a stored chord and if said comparison indicates that said compared signals are the same incrementing said storage means to the next stored chord.

27. A chord teaching device as set forth in claim 26 wherein said microprocessor unit provides a match output signal on at least one of said output lines if said comparison indicates that said compared signals are equal and said tone generator responsive to said match output signal from said microprocessor sounds said stored chord.

28. A chord teaching system for use in an electronic musical instrument having a keyboard formed by a plurality of keys with each key having a key output line and a tone generator having a plurality of input lines connected to at least one of said key output lines and producing a musical output and for storing a sequence of preselected chords, for sequentially indicating to the instrument player at least the key corresponding to the root note of each stored chord and requiring the instrument player to depress the indicated key in order to move to the next stored chord in the sequence, said chord teaching system comprising:
  a microprocessor unit having a plurality of input lines, a plurality of output lines, a memory containing information signals corresponding to chord type patterns normalized to an alphabetic note, and a storage means having a plurality of locations and containing chord signals corresponding to the chord type and the alphabetic key of a stored chord;
  said microprocessor retrieving from said storage means a chord signal corresponding to the alphabetic note of a chord stored in one of said plurality of locations and placing said signal on at least one of said output lines of said microprocessor;
  select key means actuatable by an instrument player and forming part of said keyboard and having a plurality of key output lines connected to at least one of said input lines of said microprocessor, said select key means producing key output signals on said key output lines to said microprocessor representing a key depressed by an instrument player;
  visual display means having a plurality of input lines connected to at least one of said plurality of output lines of said microprocessor for receiving said signal corresponding to the alphabetic note of the stored chord and for indicating to the instrument player one of said select keys corresponding to the alphabetic note of said stored chord; and,
  said microprocessor unit responsive to said key output signal for comparing said signal with the alphabetic note of a stored chord and if said comparison indicates that said compared signals are the same incrementing said storage means to the next one of said plurality of locations.

29. A chord teaching device as set forth in claim 28 wherein said microprocessor unit also retrieves from said memory information signals representing the normalized chord type pattern of said stored chord, shifts said normalized chord type pattern signals into the key of the stored chord and if said comparison indicates that said compared signals are equal placing said shifted normalized chord type pattern signals on at least one of said output lines of said microprocessor; said tone generator responsive to said shifted normalized chord type pattern signal from said microprocessor for sounding said stored chord.

30. A chord teaching system for use in an electronic musical instrument having a keyboard formed by a plurality of keys with each key having a key output line and a tone generator having a plurality of input lines connected to at least one of said key output lines and producing a musical output and for storing a sequence of preselected chords, for sequentially indicating to the instrument player the keys corresponding to the notes of each stored chord and requiring the instrument player to depress the indicated keys in order to move to the next stored chord in the sequence, said chord teaching system comprising:
  a microprocessor unit having a plurality of input lines, a plurality of output lines and a storage means containing information signals corresponding to stored chords;
  select key means actuatable by an instrument player and forming part of said keyboard and having a plurality of key output lines connected to at least one of said input lines of said microprocessor, said select key means producing key output signals on said key output lines to said microprocessor representing keys depressed by an instrument player;
  visual display means having a plurality of input lines connected to at least one of said plurality of output lines of said microprocessor for indicating to the instrument player said select keys corresponding to the notes of the stored chord;

said microprocessor unit responsive to said key output signals for comparing said signals with the notes of a stored chord and if said comparison indicates that said compared signals are the same incrementing said storage means to the next stored chord.

31. A chord teaching system for use in an electronic musical instrument having a keyboard formed by a plurality of keys with each key having a key output line and a tone generator having a plurality of input lines connected to at least one of said key output lines and producing a musical output and for storing a sequence of preselected chords, for sequentially indicating to the instrument player at least the key corresponding to the root note of each stored chord and requiring the instrument player to depress the indicated key in order to move to the next stored chord in the sequence, said chord teaching system comprising:

a microprocessor unit having a plurality of input lines, a plurality of output lines, a memory containing information signals corresponding to chord type patterns normalized to an alphabetic note and a storage means having a plurality of locations and containing chord signals corresponding to the chord type and the alphabetic key of a stored chord;

said microprocessor retrieving from said storage chord signals corresponding to the chord type and the alphabetic note of said chord;

select key means actuatable by an instrument player and forming part of said keyboard and having a plurality of key output lines connected to at least one of said input lines of said microprocessor, said select key means producing key output signals representing keys depressed by an instrument player on said key output lines to said microprocessor;

said microprocessor retrieving from said memory information signals corresponding to a normalized chord type pattern, shifting said normalized chord type pattern signal into the key of the stored chord and placing said shifted normalized chord type pattern signals on at least one of said output lines of said microprocessor;

visual display means having a plurality of input lines connected to at least one of said plurality of output lines of said microprocessor for receiving said shifted normalized chord type pattern signals and for indicating to the instrument player said select keys corresponding to the notes of the stored chord;

said microprocessor unit responsive to said key output signals for comparing said signals with said shifted normalized chord type pattern signals and if said comparison indicates that said compared signals are the same incrementing said storage means to the next one of said plurality of locations.

32. A chord teaching system for use in an electronic musical instrument having a keyboard formed by a plurality of keys with each key having a key output line, a tone generator means having a plurality of input lines connected to at least one of said key output lines, a rhythm unit having an output signal line and providing a rhythm beat output signal and for sounding a sequence of prestored chords at various times determined by said rhythm unit and for indicating to the instrument player the keys forming the sounding chord, said chord teaching system comprising:

a microprocessor unit having a plurality of input lines, a plurality of output lines, a memory containing informaton signals representing musical chord type patterns normalized to an alphabetic note and a storage means having a plurality of locations and containing chord signals corresponding to the chord type and the alphabetic note of a stored chord;

said microprocessor responsive to said rhythm beat output signal for retrieving said chord signals from one of said locations of said storage means, retrieving from said memory information signals representing the normalized chord type pattern for said chord signals and shifting said normalized chord type pattern signals into the alphabetic key of said chord signals and placing said shifted normalized chord type pattern signals on at least one of said output lines of said microprocessor;

said tone generator responsive to said shifted normalized chord type patten signals from said microprocessor for producing a musical output corresponding to said stored chord;

a visual display having a plurality of input lines connected to at least one of said output lines of said microprocessor for receiving signals corresponding to said shifted normalized chord type pattern signals and for indicating to the instrument player the keys corresponding to the notes of the chord sounded; and, means for incrementing said storage means to the next one of said plurality of locations.

33. A method of teaching musical chords for use with an electronic musical instrument having a keyboard formed by a plurality of keys with each key having a key output line, a chord teaching system having a plurality of output lines, a plurality of input lines, a chord type selector means comprising a plurality of switches and a memory containing information signals corresponding to musical chord type patterns normalized to a alphabetic note, a visual display associated with at least somme of said keys and a tone generator for producing a musical output having a plurality of input lines connected to at least one of said plurality of output lines of said chord teaching system, said method comprising the steps of:

selecting the chord type of the chord to be learned by depressing one of the switches on said chord type selector means;

selecting the alphabetic note of the chord to be learned by depressing one of said key on a portion of said keyboard associated with said system;

retrieving from memory information signals representing said normalized chord type pattern corresponding to said selected chord type;

shifting the retrieved normalized chord type information signals into the key of said selected chord;

providing output signals on at least some of said plurality of output lines of said chord teaching system to said tone generator for producing a musical output corresponding to said selected chord; and, indicating on said visual display the key corresponding to the root note of said selected chord to be learned.

34. A method of teaching musical chords as set forth in claim 33 wherein said chord teaching system further comprises a plurality of pedals and a pedal teaching system and said method further comprises the step of providing output signals on at least one of said output lines of said chord teaching system to said pedal teaching system for indicating the pedal corresponding to the root note of said selected chord.

35. A method of teaching musical chords for use with an electronic musical instrument having a keyboard formed by a plurality of keys with each key having a key output line, a chord teaching system having a plurality of output lines, a plurality of input lines, a chord type selector means comprising a plurality of switches and a memory containing information signals corresponding to musical chords type patterns normalized to a alphabetic note, a visual display associated with at least some of said keys and a tone generator for producing a musical output having a plurality of input lines connected to at least one of said plurality of output lines of said chord teaching system, said method comprising the steps of:
 selecting the chord type of the chord to be learned by depressing one of the switches on said chord type selector means;
 selecting the alphabetic note of the chord to be learned by depressing one of said key on a portion of said keyboard associated with said system;
 retrieving from memory information signals representing said normalized chord type pattern corresponding to said selected chord type;
 shifting the retrieved normalized chord type information signals into the key of said selected chord;
 indicating on said visual display the keys corresponding to the notes of said chord to be learned.

36. A method of teaching musical chords as set forth in claim 35 wherein said chord teaching system further comprises a plurality of pedals and a pedal teaching system and said method further comprises the step of providing output signals on at least one of said output lines of said chord teaching system to said pedal teaching system for indicating the pedal corresponding to the root note of said selected chord.

37. A method of teaching musical chords for use in an electronic musical instrument having a keyboard formed by a plurality of keys with each key having a key output line, a tone generator providing a musical output signal and a chord teaching system having a plurality of input lines responsive to at least some of said key output lines, a plurality of output lines, at least some of said output lines being connected to said tone generator, a chord type selector means comprising a plurality of switches, a storage means having a plurality of locations for retaining chord type signals and alphabetic key signals representing a sequence of chords to be learned and a visual display means associated with at least some of said keys, said method comprising the steps of:
 (a) selecting the chord type of the chord to be learned by depressing one of said switches of said chord type selector and providing a chord type signal;
 (b) selecting the alphabetic note of the chord to be learned by depressing one of said keys on a portion of said keyboard associated with said system and providing an alphabetic note signal;
 (c) receiving and retaining in one of said locations in said storage means said chord type signal and said alphabetic note signal corresponding to the chord to be learned;
 (d) incrementing said locations in said storage means for receiving and retaining another chord type signal and another alphabetic note signal corresponding to another chord to be learned.

38. A method of teaching a musical chord as set forth in claim 37 wherein said chord teaching means further comprises a memory containing information signals representing chord type patterns normalized to an alphabetic key, said method further comprising the steps of:
 (e) retrieving from said memory normalized chord type pattern information signals corresponding to said chord type signal stored in one of said locations of said storage means;
 (f) shifting said normalized chord type pattern information signals into the alphabetic key corresponding to said alphabetic note signal stored in one of said locations on said storage means;
 (b) outputting said shifted normalized chord type pattern information signals on at least one of said plurality of lines of said system to said tone generator for sounding said stored chord;
 (h) indicating on said visual display means the keys of said keyboard corresponding to the notes of said stored chord.

39. A method of teaching a musical chord as set forth in claims 37 or 38 further comprising the step of:
 (i) repeating steps (a)–(d) until a sequence of chord to be learned is retained in said plurality of locations in said storage means.

40. A method of teaching chords as set forth in claim 39 further comprising the steps of:
 (j) erasing from one of said plurality of locations in said storage means the last stored information signals corresponding to said chord type signal and said alphabetic note signal;
 (k) retrieving from said memory normalized chord type pattern information signals corresponding to said chord type stored in the last filled one of said plurality of locations in said storage means;
 (l) shifting said normalized chord type pattern information signals into the alphabetic key corresponding to said alphabetic note signal stored in said last filled one of said plurality of locations in said storage means; and,
 (m) indicating on said visual display means the keys of said keyboard corresponding to the chord stored in said last filled one of said plurality of locations in said storage means.

41. A method of teaching chords for use with an electronic musical instrument having a keyboard formed by a plurality of keys with each key having a key output line, a chord teaching unit having a plurality of output lines, a storage means having a plurality of locations containing chord type signals and alphabetic note signals representing a stored chord, a memory containing information signals representing chord type patterns normalized to a specific key, and a visual display means associated with at least some of said keys, and a tone generator connected to at least some of said plurality of output lines of said chord teaching unit for providing a musical output, said method comprising the steps of:
 (a) selecting from one of said locations in said storage means the alphabetic note signals corresponding to a stored chord;
 (b) indicating on said visual display means one of said plurality of keys on said keyboard corresponding to the alphabetic note of the stored chord;

(c) providing a key output siganl by depressing one of said plurality of keys on said keyboard;
(d) comparing said key output signal to said alphabetic note signal;
(e) incrementing said location in said storage means to the next one of said plurality of locations.

42. A method of teaching musical chords as set forth in claim 41 further comprising the steps of:
(f) retrieving from said memory normalized chord type pattern information signals corresponding to said chord type signal of said stored chord;
(g) shifting said normalized chord type pattern information signals into the alphabetic key corresponding to said alphabetic note signal of said stored chord;
(h) outputting said shifted normalized chord pattern signals on at least one of said output lines of said chord teaching unit to said tone generator for sounding said stored chord, if said key output signal corresponds to said alphabetic signal.

43. A method of teaching chords as set forth in claim 42 further comprising the steps of:
(i) repeating steps (a)–(h) until the sequence of chords retained in said plurality of locations in said storage means has been sounded.

44. A method of teaching chords for use with an electronic musical instrument having a keyboard formed by a plurality of keys with each key having a key output line, a chord teaching unit having a plurality of input lines connected to at least one of said key output lines, a plurality of output lines, a storage means having a plurality of locations containing information signals reresenting a sequence of stored chords, and a tone generator having a plurality of input lines connected to at least one of said plurality of output lines of said chord teaching unit and a visual display means associated with at least some of said keys, said method comprising the steps of:
(a) selecting from one of said plurality of locations in said storage means the information signals corresponding to a stored chord;
(b) indicating on said visual display means on one of said keys on said keyboard corresponding to the alphabetic note of the stored chord;
(c) providing a key output signal to said system by depressing one of said plurality of keys on said keyboard;
(d) comparing said key output signal to said information signal;
(e) incrementing said locations in said storage means to the next one of said plurality of storage locations if said key output signal corresponds to the alphabetic note of said stored chord represented by said information signal;
(f) outputing to said tone generator said information signals for sounding said stored chord if said output signal corresponds to the alphabetic note of said stored chord represented by said information signal.

45. A method of teaching chords as set forth in claim 44 further comprising the step of:
(g) repeating steps (a)–(f) until the sequence of chords retained in said storage means has been sounded.

46. A method of teaching chords for use with an electronic musical instrument having a keyboard formed by a plurality of keys with each key having a key output line, a chord teaching unit having a storage means having a plurality of locations containing chord type signals and alphabetic note signals representing a stored chord, a memory containing information signals representing chord type patterns normalized to a specific key, and a display means associated with at least some of said keys, said method comprising the steps of:
(a) selecting from one of said locations in said storage means the chord type signal and alphabetic note signal corresponding to a stored chord;
(b) retrieving from said memory normalized chord type pattern information signals corresponding to said chord type signal of said stored chord;
(c) shifting said normalized chord type pattern information signals into the alphabetic key corresponding to said alphabetic note signal of said stored chord;
(d) indicating on said visual display means the keys on said keyboard corresponding to notes forming said stored chord;
(e) producing key output signals by depressing a plurality of said keys on said keyboard;
(f) comparing said key output signals to said shifted normalized chord type pattern signals; and,
(g) incrementing said location in said storage means to the next storage location if said key output signals correspond to said shifted normalized chord type pattern signals.

47. A method of teaching chords as set forth in claim 46 further comprising the step of:
(h) repeating steps (a)–(g) until the sequence of chords retained in said plurality of locations in said storage means is used.

48. A method of teaching chords for use with an electronic musical instrument having a keyboard formed by a plurality of keys with each key having a key output line, a chord teaching unit having a plurality of input lines connected to at least one of said key output lines, a storage means having a plurality of locations containing information signals representing a sequence of stored chords and visual display means associated with at least some of said keys, said method comprising the steps of:
(a) selecting from one of said plurality of locations in said storage mans the information signals corresponding to a stored chord;
(b) indicating on said visual display means said keys on said keyboard corresponding to notes forming said stored chord;
(c) producing key output signals to said system by depressing a plurality of said keys on said keyboard;
(d) comparing said key output signals to said information signal; and,
(e) incrementing said location in said storage means to the next one of said plurality of storage locations if said key output signals corresponds to said information signals of said stored chord.

49. A method of teaching chords as set forth in claim 48 further comprising the step of:
(f) repeating steps (a)–(e) until the sequence of chords retained in said plurality of locations in said storage means is used.

50. A method for teaching chords for use in an electronic musical instrument having a keyboard formed by a plurality of keys with each key having a key output line, a tone generator means having a plurality of input lines connected to at least one of said key output lines, a rhythm unit having an output signal line and providing rhythm beat output signals and a chord teaching system comprising a storage means having a plurality of locations containing information signals representing a sequence of stored chords and a memory containing signals representing chord type patterns normalized to a alphabetic key, said method comprising the steps of:

(a) selecting from one of said plurality of locations in said storage means information signals corresponding to a stored chord;

(b) retrieving from said memory normalized chord pattern signals corresponding to said information signals;

(c) shifting said normalized chord pattern signals into the key of said stored chord;

(d) receiving said rhythm output signal and outputting said shifted normalized chord pattern signals to said tone generator for sounding said stored chord under control of said rhythm signal;

(e) outputting said shifted normalized chord pattern signals to said visual display for indicating the keys of said keyboard corresponding to the notes forming said stored chord;

(f) incrementing said location in said storage means to the next storage location.

51. A method of teaching chords as set forth in claim 50 further comprising the step of:

(g) repeating steps (a)–(f) until the sequence of stored chords in said plurality of locations in said storage means are sounded.

* * * * *